United States Patent
Eda

(10) Patent No.: US 12,193,075 B2
(45) Date of Patent: Jan. 7, 2025

(54) METHODS AND APPARATUS FOR HANDLING MULTIPLE RACH PROCEDURES IN WIRELESS COMMUNICATION SYSTEM

(71) Applicant: SAMSUNG ELECTRONICS CO., LTD., Suwon-si (KR)

(72) Inventor: Raja Moses Manoj Kumar Eda, Karnataka (IN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 322 days.

(21) Appl. No.: 17/941,783

(22) Filed: Sep. 9, 2022

(65) Prior Publication Data

US 2023/0072939 A1  Mar. 9, 2023

Related U.S. Application Data

(63) Continuation of application No. PCT/KR2022/013467, filed on Sep. 7, 2022.

(30) Foreign Application Priority Data

Sep. 9, 2021 (IN) .............................. 202141040998
May 19, 2022 (IN) .............................. 202141040998

(51) Int. Cl.
*H04W 74/0833* (2024.01)
*H04W 72/23* (2023.01)
*H04W 80/02* (2009.01)

(52) U.S. Cl.
CPC ....... *H04W 74/0841* (2013.01); *H04W 72/23* (2023.01); *H04W 80/02* (2013.01)

(58) Field of Classification Search
None
See application file for complete search history.

(56) References Cited

U.S. PATENT DOCUMENTS

| | | |
|---|---|---|
| 2016/0278130 A1 | 9/2016 | Uchino et al. |
| 2020/0329405 A1 | 10/2020 | Awoniyi-Oteri et al. |

(Continued)

FOREIGN PATENT DOCUMENTS

| | | | |
|---|---|---|---|
| WO | 2017/138988 | | 8/2017 |
| WO | 2020/143033 | | 7/2020 |
| WO | 2021-092585 | | 5/2021 |
| WO | WO2021240052 | * | 5/2021 |
| WO | 2021-159336 | | 8/2021 |

OTHER PUBLICATIONS

Search Report dated Dec. 22, 2022 in International Patent Application No. PCT/KR2022/013467.

(Continued)

*Primary Examiner* — Mohammad S Adhami
(74) *Attorney, Agent, or Firm* — Nixon & Vanderhye, P.C.

(57) ABSTRACT

The disclosure relates to a 5G or 6G communication system for supporting a higher data transmission rate. A method performed by a user equipment (UE) in a wireless communication system is provided. The method includes detecting triggering of a first random access channel (RACH) procedure running on a primary stack at the UE upon detection of a RACH trigger condition on the primary stack, while the UE is connected to at least one cell, detecting triggering of a second RACH procedure while the first RACH procedure is ongoing in the UE, wherein the second RACH procedure is different from the first RACH procedure, enabling a dual active protocol stack (DAPS) capability to initiate a secondary stack for handling the second RACH procedure, performing the first RACH procedure on the primary stack and the second RACH procedure on the secondary stack, simultaneously, and disabling the secondary stack upon successful completion of the second RACH procedure.

20 Claims, 35 Drawing Sheets

(56) References Cited

U.S. PATENT DOCUMENTS

| | | | |
|---|---|---|---|
| 2020/0367101 A1 | 11/2020 | Paladugu et al. | |
| 2021/0051539 A1 | 2/2021 | Zhang | |
| 2021/0058822 A1 | 2/2021 | Ly et al. | |
| 2022/0264680 A1* | 8/2022 | Kim | H04W 76/15 |
| 2022/0303838 A1* | 9/2022 | Wang | H04W 36/0069 |
| 2023/0224740 A1* | 7/2023 | Yu | H04W 24/04 370/252 |
| 2023/0370910 A1* | 11/2023 | Sabouri-Sichani | H04W 36/0072 |

OTHER PUBLICATIONS

Written Opinion dated Dec. 22, 2022 in International Patent Application No. PCT/KR2022/013467.

Ericsson, "Single vs dual active protocol stack for reduced handover interruption", Tdoc R2-1903894, 3GPP TSG-RAN WG2#105bis, Mar. 28, 2019, 8 pages.

ETRI, 'Single and Dual Active eMBB Combined Solution', R2-1903910, 3GPP TSG-RAN WG2 Meeting #105bis, Mar. 29, 2019, 8 pages.

Qualcomm Incorporated, 'LTE mobility enhancements for eMBB HO using dual active protocol stack', R2-1904646, 3GPP TSG-RAN WG2 Meeting #105bis, Mar. 29, 2019, 12 pages.

3rd Generation Partnership Project; Technical Specification Group Radio Access Network;NR; NR and NG-RAN Overall Description; Stage 23GPP TS 38.300 V16.5.0, Mar. 2021, pp. 1-151.

3rd Generation Partnership Project; Technical Specification Group Radio Access Network; NR; Medium Access Control (MAC) protocol specification 3GPP TS 38.321 V16.4.0, Mar. 2021, pp. 1-157.

Office Action dated Apr. 27, 2023 in Indian Patent Application No. 202141040998 and English-language translation.

* cited by examiner

METHODS AND APPARATUS FOR HANDLING MULTIPLE RACH PROCEDURES IN WIRELESS COMMUNICATION SYSTEM

CROSS-REFERENCE TO RELATED APPLICATION(S)

This application is a continuation of PCT/KR2022/013467, filed on Sep. 7, 2022, at the Korean Intellectual Property Receiving Office and claims priority under 35 U.S.C. § 119 to Indian Provisional Patent Application No. 202141040998, filed on Sep. 9, 2021, and Indian Non-Provisional patent application No. 202141040998, filed on May 19, 2022, in the Indian Patent Office, the disclosures of each which are incorporated by reference herein in their entireties.

BACKGROUND

1. Field

The present disclosure relates to the field of wireless networks and more particularly to handling multiple Random Access Channel (RACH) procedures in the wireless networks.

2. Description of Related Art 5G mobile communication technologies define broad frequency bands such that high transmission rates and new services are possible, and can be implemented not only in "Sub 6 GHz" bands such as 3.5 GHZ, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

According to 3rd Generation Partnership Project (3GPP) TS 38.321, 5.1.1 (Random Access procedure initialization), there may be only one Random Access Channel (RACH) procedure ongoing at any time in a Medium Access Control (MAC) entity of a User Equipment (UE) to connect with at least one cell. Such a restriction in combination with other UE complexities may not allow the UE to trigger multiple RACH procedures at a same time, thus, the UE is enabled to trigger the RACH procedure in a sequential order. Also, in New Radio (NR), concepts such as on-demand System Information (SI) request, or the like, may lead to a scenario in which the UE has to trigger the multiple RACHs (due to different trigger reasons) at the same time. Since the current 3GPP specification allows the UE to perform only one RACH procedure, the UE may delay one of the RACH procedures (e.g., the 2nd RACH), which may affect user/UE performance and the respective RACH procedure, as depicted in FIG. 1A.

Also, in Uplink (UL) Carrier Aggregation (CA) scenarios with two Timing Alignment Groups, when the UE is performing the RACH procedure on one Secondary Timing Advance Group (sTAG) and there is a RACH trigger on the other TAG (for example, a pTAG), the UE delays the RACH procedure to be performed on the pTAG. If the RACH procedure to be performed on the pTAG is for critical data services, then delaying the RACH procedure on the pTAG may impact the performance of the critical services (for example, for the CA, there may be a single MAC entity shared among all the cells).

Also, in a multiple beams (multi-beam) scenario, the UE may perform the RACH procedure to connect to the at least one cell/beam, wherein the RACH procedure may be triggered due to at least one of, trigger reasons such as Beam Failure Recovery (BFR), UL grants, UL sync, or the like, temporary RACH issues, and so on. However, performing only one RACH procedure on the single cell/beam may not be successful always (e.g., RACH MSG1 on beam 1), as depicted in FIG. 1B. Thus, adding the delay, which impacts latency based critical services, and user experience.

As per the RACH procedure descried in the 3GPP TS 38.321-5.1.1, the RACH procedure initialization may be initiated by a Physical Downlink Control Channel (PDCCH) order by the MAC entity itself, or by Radio Resource Control (RRC) for events defined in accordance with the 3GPP TS 38.300. Thus, there may be only one RACH procedure ongoing at any point in time in the MAC entity. If a new RACH procedure is triggered while another is already ongoing in the MAC entity, the UE may decide whether to continue with the ongoing RACH procedure or start with the new RACH procedure (for example, for a SI request) based on a UE implementation.

Release 16 of the 3GPP NR specification TS 38.300 introduces Dual Active Protocol Stack (DAPS) to improve a handover (HO) procedure. In the handover procedure, the UE maintains a source gNodeB (gNB)/source cell connection after receiving an RRC message (i.e., a HO command) for a handover, until releasing the source cell after successful random access to a target gNB/target cell, as depicted in FIG. 2. Thus, the connection of the UE with the source cell remains active for reception (Rx) and transmission (Tx) of user data, until the UE is able to send and receive user data in the target cell, thereby introducing a new requirement at the UE to simultaneously receive and the transmit the user data at both the source cell and the target cell for a short time period during the handover procedure.

However, the current 3GPP specification does not provide any mechanisms to enable the UE to use the DAPS capability to perform multiple RACH procedures at a same time such as at a handover.

SUMMARY

In accordance with various embodiments of the disclosure, a method performed by a user equipment (UE) in a wireless communication system is provided. The method includes detecting triggering of a first random access channel (RACH) procedure running on a primary stack at the UE upon detection of a RACH trigger condition on the primary stack, while the UE is connected to at least one cell, detecting triggering of a second RACH procedure while the first RACH procedure is ongoing in the UE, wherein the second RACH procedure is different from the first RACH procedure, enabling a dual active protocol stack (DAPS) capability to initiate a secondary stack for handling the second RACH procedure, performing the first RACH procedure on the primary stack and the second RACH procedure on the secondary stack, simultaneously, and disabling the secondary stack upon successful completion of the second RACH procedure.

In accordance with various embodiments of the disclosure, a UE in a wireless communication system is provided. The UE includes a transceiver and a controller coupled with the transceiver. The controller is configured to detect triggering of a first RACH procedure running on a primary stack at the UE upon detection of a RACH trigger condition on the primary stack, while the UE is connected to at least one cell, detect triggering of a second RACH procedure while the first RACH procedure is ongoing in the UE, wherein the second RACH procedure is different from the first RACH procedure, enable a DAPS capability to initiate a secondary stack for handling the second RACH procedure, perform the first RACH procedure on the primary stack and the second RACH procedure on the secondary stack, simultaneously, and disable the secondary stack upon successful completion of the second RACH procedure.

Various embodiments provide methods and systems for handling multiple RACH procedures in a wireless network. The method includes detecting, by a UE, triggering of a first RACH procedure running on a primary stack at the UE upon detection of a RACH trigger condition on the primary stack, while the UE is connected to at least one cell in the wireless network. Further, the method includes detecting, by the UE, triggering of a second RACH procedure while the first RACH procedure is ongoing in the UE, wherein the second RACH procedure is different from the first RACH procedure. Further, the method includes enabling, by the UE, a Dual Active Protocol Stack (DAPS) capability to initiate a secondary stack for handling the second RACH procedure. Further, the method includes performing, by the UE, the first RACH procedure on the primary stack and the second RACH procedure on the secondary stack simultaneously. Further, the method includes disabling, by the UE, the secondary stack upon successful completion of the second RACH procedure.

Various embodiments provide methods and systems for handling RACH procedures in a wireless network. The method includes detecting, by a UE, a requirement to connect to at least one network element depending on an event triggered to perform a RACH procedure by the UE. Further, the method includes detecting, by the UE, a first element from the at least one network element and a second element from the at least one network element including at least one parameter satisfying at least one of cell selection criteria and RACH criteria, when the UE wants to connect to the at least one network element based on the detected requirement. Further, the method includes enabling, by the UE, a DAPS capability to initiate a secondary stack based on the detection. Further, the method includes initiating, by the UE, a first RACH procedure on the first network element using a primary stack and the second RACH procedure on the second network element using the secondary stack simultaneously in response to enabling the DAPS capability at the UE. Further, the method includes aborting, by the UE, an ongoing RACH procedure using the secondary stack, upon determining the first RACH procedure using the primary stack is completed before completion of the RACH procedure using the secondary stack. Further, the method includes disabling, by the UE, the secondary stack, upon successful completion of the RACH procedure using one of the primary stack and the secondary stack.

Various embodiments provide a UE in a wireless network comprising a RACH procedures processing controller coupled with a memory. The RACH procedures processing controller detects a triggering of a first RACH procedure running on a primary stack at the UE upon detection of a RACH trigger condition on the primary stack, while the UE is connected to at least one cell in the wireless network. Further, the RACH procedures processing controller detects triggering of a second RACH procedure while the first RACH procedure is ongoing in the UE, wherein the second RACH procedure is different from the first RACH procedure. Further, the RACH procedures processing controller enables a DAPS capability to initiate a secondary stack for handling the second RACH procedure. Further, the RACH procedures processing controller performs the first RACH procedure on the primary stack and the second RACH procedure on the secondary stack simultaneously. Further, the RACH procedures processing controller disables the secondary stack upon successful completion of the second RACH procedure.

Various embodiments provide a UE in a wireless network comprising a RACH procedures processing controller coupled with a memory. The RACH procedures processing controller detects a requirement to connect to at least one network element depending on an event triggered to perform a RACH procedure by the UE. Further, the RACH procedures processing controller detects a first element from the at least one network element and a second element from the at least one network element including at least one parameter satisfying at least one of cell selection criteria and RACH criteria, when the UE wants to connect to the at least one network element based on the detected requirement. Further, the RACH procedures processing controller enables a DAPS capability to initiate a secondary stack based on the detection. Further, the RACH procedures processing controller initiates a first RACH procedure on the first network element using a primary stack and the second RACH procedure on the second network element using the secondary stack simultaneously in response to enabling the DAPS capability at the UE. Further, the RACH procedures processing controller aborts an ongoing RACH procedure using the secondary stack, upon determining the first RACH procedure using the primary stack is completed before completion of the RACH procedure using the secondary stack. Further, the RACH procedures processing controller disables the secondary stack, upon successful completion of the RACH procedure using one of the primary stack and the secondary stack.

Various embodiments provide methods and systems for performing multiple Random Access Channel (RACH) procedures.

Various embodiments provide methods and systems for enabling the UE to use a Dual Active Protocol Stack (DAPS) to initiate a secondary stack and handle the multiple RACH procedures on a primary stack, and a secondary stack simultaneously.

Various embodiments provide methods and systems for enabling the UE to disable the secondary stack upon successful completion of a RACH procedure performed on the secondary stack or the primary stack.

Various embodiments provide methods and systems for enabling the UE to create/initiate the secondary stack using the DAPS capability and initiate the RACH procedure on a first beam/cell and a second beam/cell using the primary stack and the secondary stack simultaneously.

Various embodiments provide methods and systems for aborting the ongoing RACH procedure using the secondary stack, if the RACH procedure using the primary stack is completed before completion of the RACH procedure using the secondary stack or vice-versa, an disabling the secondary stack, upon successful completion of the RACH procedure using any of the primary stack or the secondary stack.

Various embodiments provide methods and systems for detecting more than one beam or cell satisfying selection criteria and thereby enabling DAPS to try latching on both simultaneously reducing the time to select the beam/cell.

Various embodiments provide methods and systems for initiating the secondary stack when a RACH collision is detected to make possible two RACH simultaneously and avoid delay for second RACH services. This is completely initiated and controlled by the UE itself. Based on the methods disclosed herein, both the stacks are latched to same cell. Also, two RACH are ongoing simultaneously using a primary cell RACH configuration on the same cell. The RACH configuration is shared to the secondary stack by the primary cell itself and the secondary stack is initiated by using the same configuration of primary cell. Two RACH on the same cell is made possible. The DAPS is released by UE upon completion of RACH.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

BRIEF DESCRIPTION OF THE DRAWINGS

Embodiments herein are illustrated in the accompanying drawings, throughout which like reference letters indicate corresponding parts in the various figures. The embodiments herein will be better understood from the following description with reference to the drawings. The above and other aspects, features and advantages of certain embodiments of the present disclosure will be more apparent from the following detailed description, taken in conjunction with the accompanying drawings, in which.

DETAILED DESCRIPTION

Figure 1A:
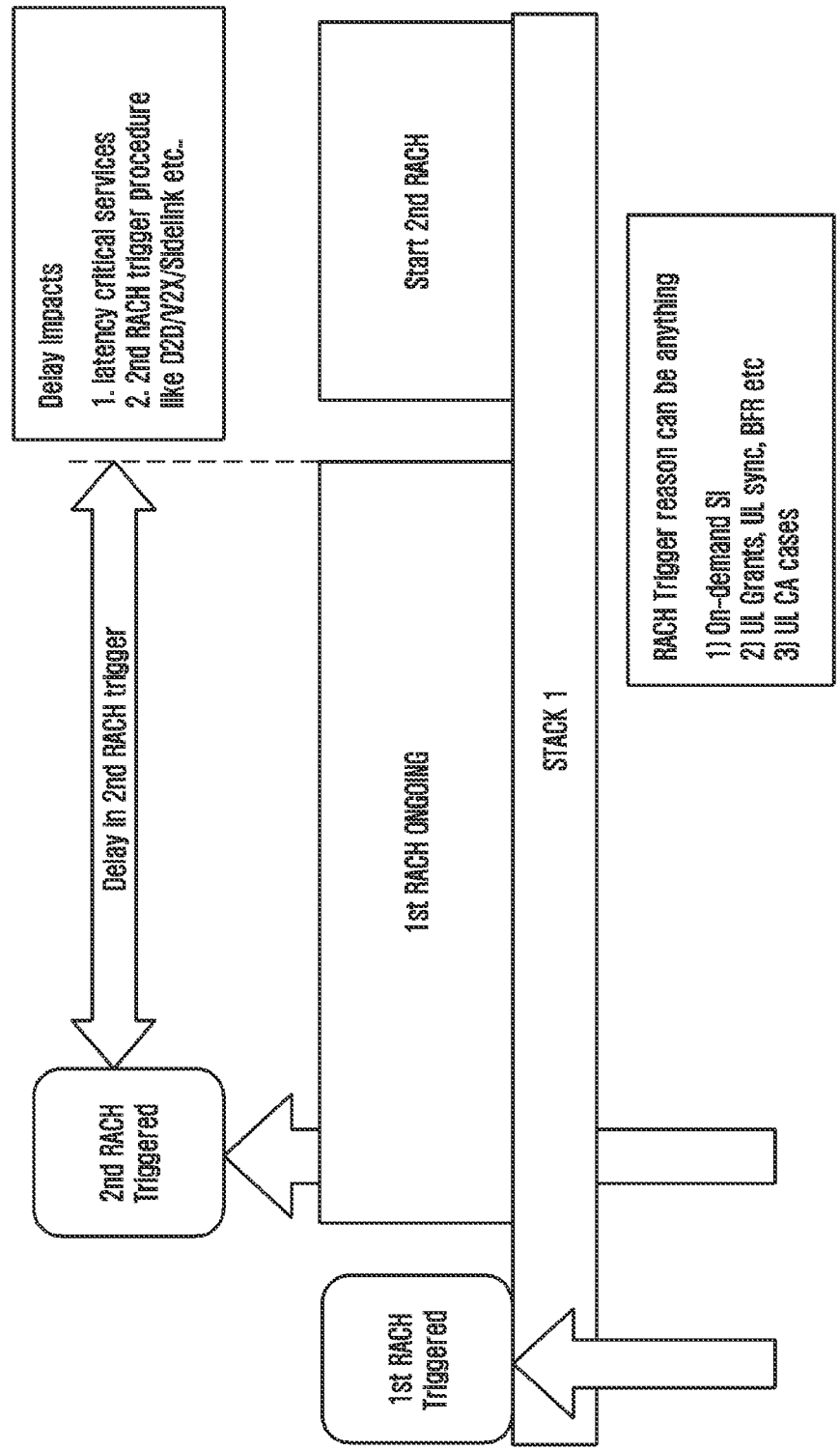
FIG. 1A depicts an example scenario for handling Random Access Channel (RACH) procedures, according to conventional art.
Figure 1B:
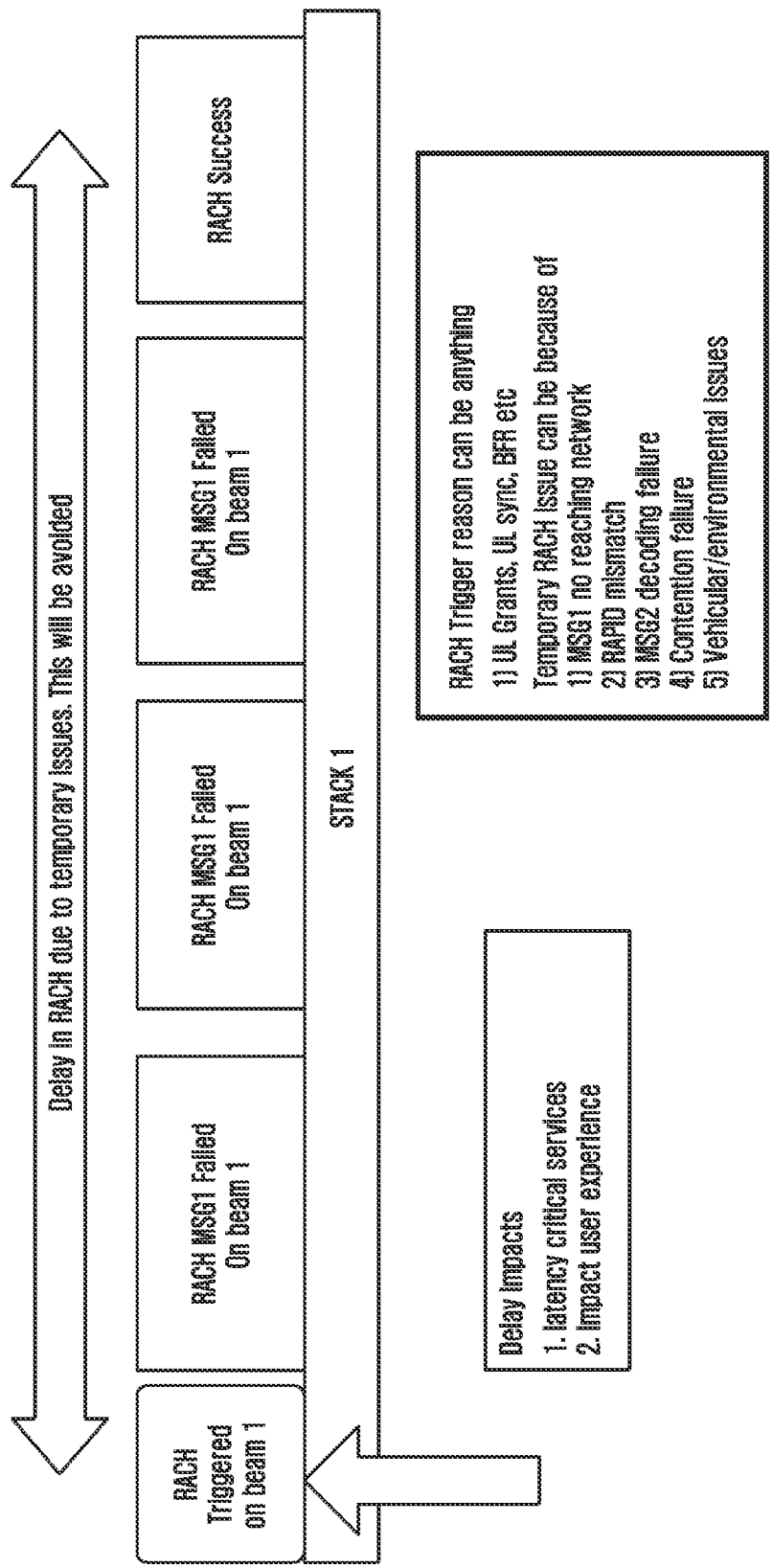
FIG. 1B depicts an example scenario for handling RACH procedures, according to conventional art.
Figure 2:
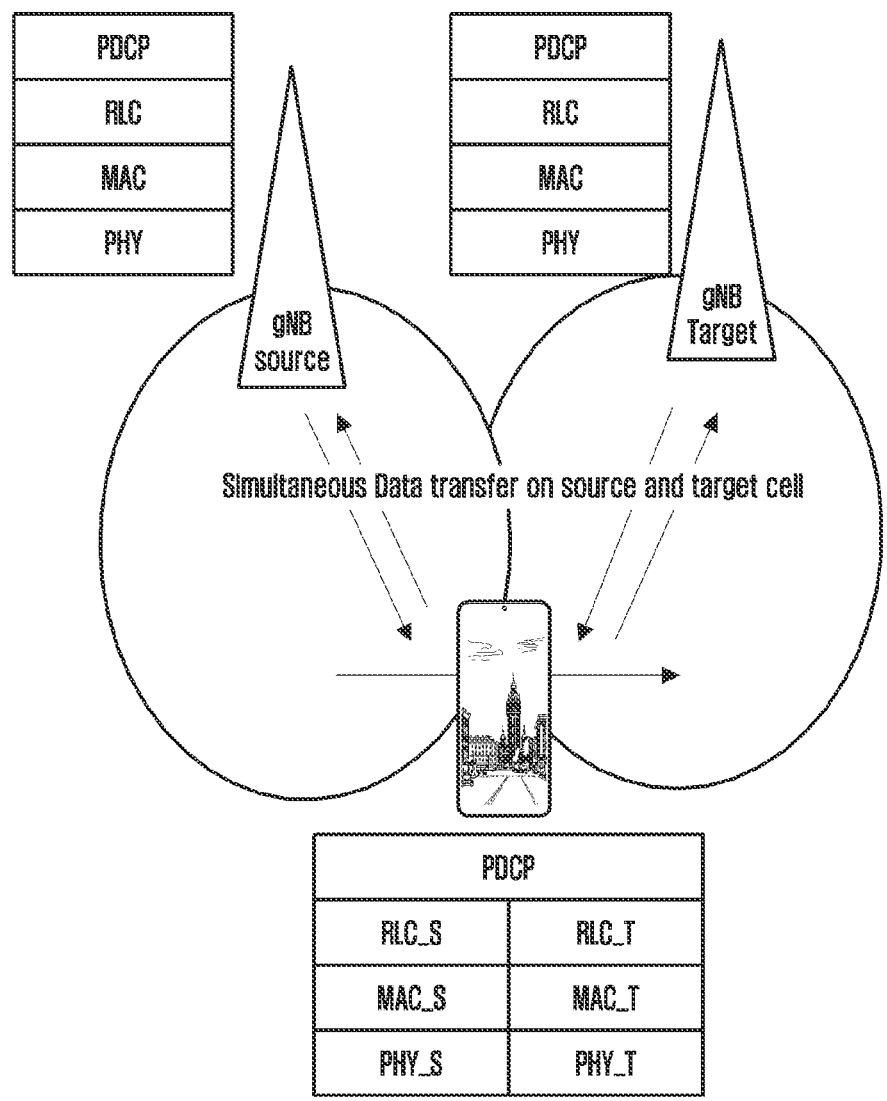
FIG. 2 depicts a handover scenario using a dual stack, according to conventional art.

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

Embodiments herein disclose methods and systems for handling multiple Random Access Channel (RACH) procedures.

A method according to various embodiments enables the DAPS feature to handle simultaneous multiple RACH, thereby leading to faster RACH handling. The method according to various embodiments enables the DAPS feature to simultaneously attempt to connect to multiple beams or cells when multiple beams of cells satisfy the selection criteria.

A method according to various embodiments can be used to enhance the user experience and reduce delay in second RACH using processing 2 RACH simultaneously. In a method according to various embodiments, accommodating 2 RACH at same time will help UE in many scenarios mentioned and thus help in better user experience and also avoid delay in critical data and services. A method according to various embodiments uses Dual Active protocol stack (DAPS) which will have 2 MAC entity, so each MAC entity can accommodate one RACH procedure.

In a method according to various embodiments, UE's which support DAPS mechanism can activate 2 stacks by themselves without network intervention and trigger RACH on 2 different beams, which will help a UE to overcome from temporary issues on some beams, and thus enable a UE to compete the RACH procedure at a faster rate.

For latency critical applications, performing RACH on 2 different beams will help to recover from beam failure with reduced latency, resume the services as soon as possible, and benefit UE to completed RACH earlier on one of the beam. Also accessing 2 different cells at same time is made possible, even if RACH is failing on one cell or there is extra delay on one of the cells, then UE can (re) gain services if RACH is successful on one cell. Also, in un-licensed spectrum this solution will be very helpful as there can be LBT (listen before talk) failure on one beam but other beam RACH can be successful due to the nature of devices working on un-licensed spectrum.

Various example embodiments are shown with reference to the drawings, and more particularly to FIGS. 3A through 22, where similar reference characters denote corresponding features consistently throughout the figures.

Figure 3A:
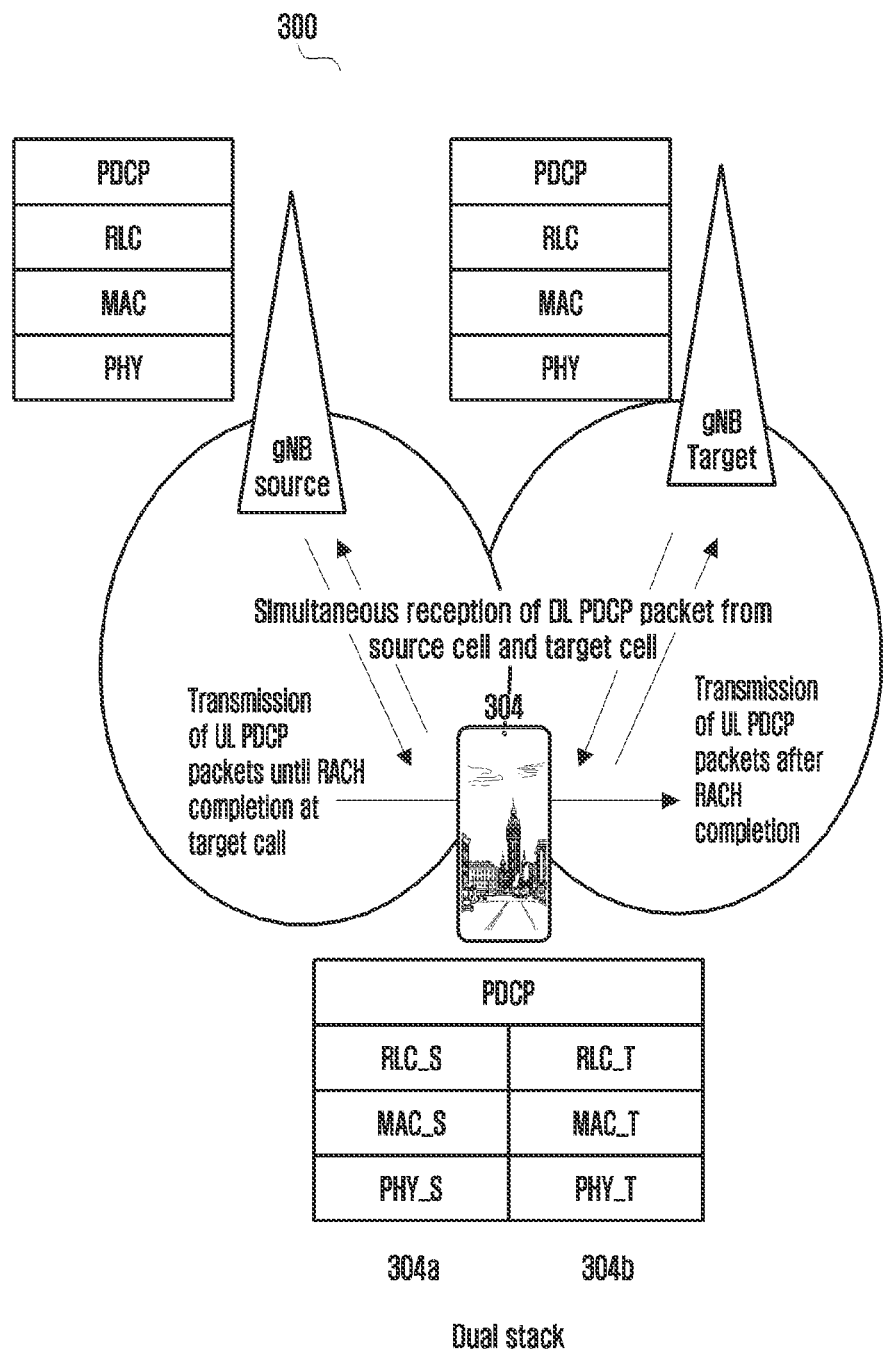
FIG. 3A depicts an example wireless network, according to various embodiments.
Figure 3B:
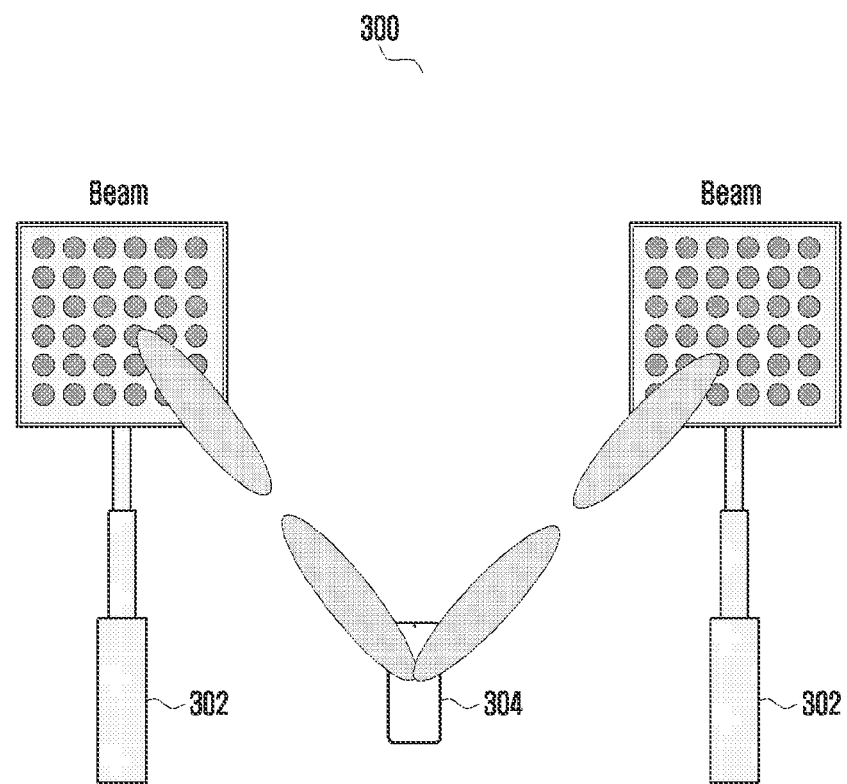
FIG. 3B depicts an example wireless network, according to various embodiments.
Figure 3C:
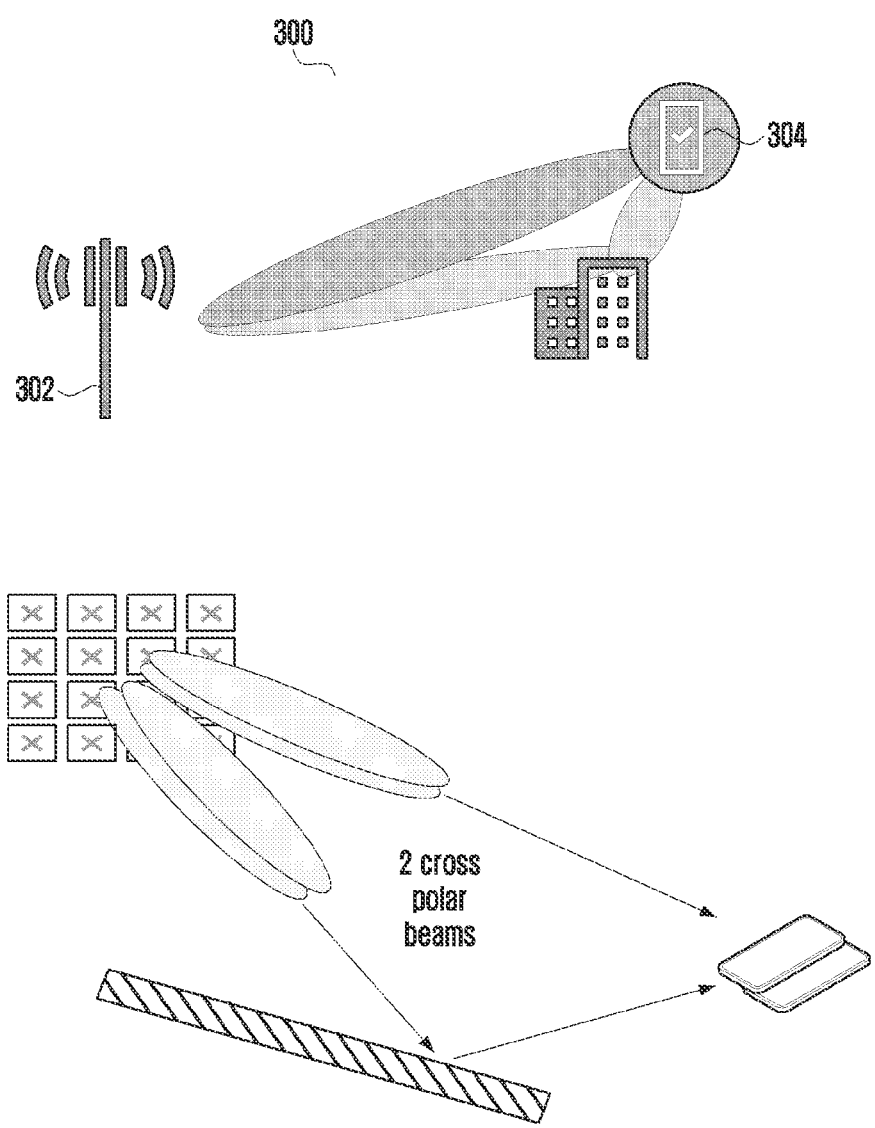
FIG. 3C depicts an example wireless network, according to various embodiments.

FIGS. 3A, 3B, and 3C depict an example wireless network 300, according to various embodiments herein. The wireless network 300 includes a plurality of Base Stations 302, and a plurality of User Equipments (UEs) 304.

The BS(s)/network 302 may be a radio node configured to communicate with the one or more UEs 304 and connect the one or more UEs 304 with a core network (not shown) for communication services. The BS 302 may communicate with the one or more UEs 304 via a same or different Radio Access Technologies (RATs). Examples of the RATs may be, but are not limited to, a Third Generation Partnership 3rd Generation Partnership Project (3GPP) Long Term Evolution (LTE/4G), an LTE-Advanced (LTE-A), a Fifth Generation (5G) New Radio, a 6G wireless system, a Wireless Local Area Network (WLAN), a Worldwide Interoperability for Microwave Access (WiMAX/IEEE 802.16), a Wi-Fi (IEEE 802.11), an Evolved-UTRA (E-UTRA), or any other next generation network. The BS 302 provides at least one cell to the UE 304, wherein the at least one cell indicates a geographical area in which the communication services may be offered to the UE 304. The BS 302 may be at least one of, a macro-BS, a micro-BS, a femto-BS, a pico-BS, and so on.

The BS 302 of the at least one RAT may support dual connectivity (DC). In order to achieve the DC, the BS 302 may support a bearer split functionality. In an example herein, the BS 302 may act as a master node (MN) or a secondary node (SN). The MN may be the BS/node associated with the macro cell, which provides radio resources to the UE 304 by acting as a mobility anchor towards the core network. The SN may be the BS/node associated with the small cell/pico cell, which provides additional radio resources to the UE 304. If the BS 302 acts as the MN, then the BS 302 may be associated with serving cells/carrier frequencies such as a primary carrier/Master Cell Group. If the BS 302 acts as the SN, then the BS 302 may be associated with the serving cells/carrier frequencies such as a secondary carrier/Secondary Cell Group (SCG), respectively. The MCG and the SCG may be a group of cells including a primary cell (PCell)/primary SCell (PSCell) and optionally one or more Secondary Cells (SCells).

In an example, the wireless network 300 may be a beam forming millimeter wave (mmWave) network, as depicted in FIGS. 3B and 3C. In such a scenario, the BS/cell 302 may transmit one or more beams to the UE 304 for connecting. Embodiments herein use the terms such as "BSs", "network", "cells", "macro-BSs", "pico-BSs", "eNodeBs (eNBs)", "gNBs", "Radio Access Network (RAN)", "network", "beams", and so on, interchangeably to refer to a Base Transceiver System (BTS)/station that communicates with the one or more UEs 304.

The UE(s) 304 referred herein may be a user device capable of supporting the wireless network 300. Examples of the UE 304 may be, but are not limited to, a mobile phone, a smartphone, a tablet, a phablet, a Personal Digital Assistant (PDA), a laptop, a computer, a wearable computing device, a vehicle infotainment device, an Internet of Things (IoT) device, a Wireless Fidelity (Wi-Fi) router, a USB dongle, a television, a vehicle with communication facility (for example, a connected car), or any other processing device supporting the wireless network 300.

The UE 304 may be configured to synchronize with the at least one BS 302 in downlink (DL) as well as in uplink (UL), when the UE 304 wants to connect to the at least one BS 302 or the associated RAT. The UE 304 performs the synchronization with the BS 302 in the DL, on obtaining DL synchronization by successfully decoding a Synchronization Signal Block (SSB) received from the BS 302. The UE 304 performs a Random Access Channel (RACH) procedure to establish an UL synchronization (sync) and a Radio Resource Control (RRC) connection with the BS 302. The RACH procedure may include at least one of, a Contention Based Random Access (CBRA) procedure, and a Non-Contention or Contention Free Random Access (CFRA) procedure (as defined in the 3GPP specification).

In an embodiment, the UE 304 may be configured to handle/perform multiple RACH procedures simultaneously. In an example embodiment, the multiple RACH procedures may be same RACH procedures. In an example embodiment, the multiple RACHs procedures may be different RACH procedures.

Embodiments herein describe the handling of the multiple RACH procedures, wherein the multiple RACH procedures are different RACH procedures.

For performing the multiple RACH procedures, the UE 304 detects triggering of a first RACH procedure on a primary stack 304a, while the UE 304 is connected to the at least one cell/BS 302 in the wireless network 300. Embodiments herein use terms such as "primary stack", "UE stack 1", "first stack", and so on, interchangeably through the document. The primary stack 304a may include a physical layer (PHY) entity, a Medium Access Channel (MAC) layer entity, a Radio Link Control (RLC) layer entity, Packet Data Convergence Protocol (PDCP) layer entity, or the like.

In an example herein, the first RACH procedure may include at least one of, but is not limited to, a non-handover procedure, a RACH procedure triggered for UL grants and UL synchronization, or a RACH procedure triggered on the at least one cell/BS 302 from a Primary Timing Advance Group (pTAG) in the wireless network 300, wherein the at least one cell/BS 302 is the primary cell/MN.

The UE 304 detects triggering of a second RACH procedure, while the first RACH procedure is ongoing on the primary stack 304a. In an embodiment, the second RACH procedure may be different from the first RACH procedure. In an example, the second RACH procedure may be an on-demand System Information (SI) RACH procedure, when the first RACH procedure is the RACH procedure triggered for the UL grants and the UL synchronization. In another example, the second RACH procedure may be a RACH procedure triggered on a secondary cell from a Secondary Timing Advance Group (sTAG) in the wireless network 300, when the first RACH procedure is the RACH procedure triggered on the primary cell from the pTAG, wherein the RACH procedure is configured with a Carrier Aggregation (CA). In another example, the second RACH procedure may be a RACH procedure triggered due to a System Information (SI) request/on-demand SI request received from the at least one cell/BS 302 for one or more services or based on cell reselection parameters. The SI request may be a request other than a System Information Block 1 (SIB1). Examples of the one or more services may be, but are not limited to, a Vehicle to Everything (V2X) service, a Device to Device (D2D) service, a Side link service, and so on.

In an embodiment, the second RACH may be triggered, when the UE 304 receives the on-demand SI request for the one or more services during the ongoing first RACH procedure. In an embodiment, the second RACH may be triggered, when the UE 304 has UL data to send to the cell/BS 302 for the UL synchronization during the ongoing first RACH procedure. In an embodiment, the second RACH procedure may be triggered, when the UE 304 has the UL data to send to the cell/BS 302 and no grants are available for the UE 304 to send the UL data during the ongoing first RACH procedure. In an embodiment, the second RACH procedure may be triggered on the secondary cell/SN, when the UE 304 configured with a UL-CA triggers the first RACH procedure on the primary cell. The primary cell and the secondary cell may have a single Medium Access Control (MAC) entity.

On detecting the second RACH procedure while the ongoing first RACH procedure, the UE 304 enables a Dual Active Protocol Stack (DAPS) capability to initiate/create a secondary stack 304b for handling the second RACH procedure. The UE 304 creates the secondary stack by configuring the secondary stack 304b with configurations of one or more entities/layers of the primary stack 304a. Examples of the one or more entities/layers of the secondary stack 304b may be, but are not limited to, the physical layer entity, the MAC layer entity, the RLC layer entity (an optional layer), or the like. Embodiments herein use terms such as "secondary stack", "UE stack 2", "second stack", and so on, interchangeably through the document.

The UE 304 shares RACH trigger configurations/RACH configurations corresponding to the second RACH procedure from the primary stack 304a to the secondary stack 304b to handle the second RACH procedure. The UE 304 receives the RACH trigger configurations corresponding to the secondary RACH procedure on the primary stack 304a as part of the SIB1, or an RRC reconfiguration message, based on a trigger reason for the second RACH procedure and/or network configurations.

On sharing the RACH trigger configurations, the UE 304 configures the secondary stack 304b for handling the second RACH procedure. In an example, the UE 304 configures the secondary stack 304b by providing configurations of the physical layer entity and the configurations of the MAC entity to the secondary stack 304b. The UE 304 also shares configurations of the RLC entity from the primary stack 304a to the secondary stack 304b, only if the configurations of the RLC entity are required for the secondary stack 304b to handle the second RACH procedure.

For an embodiment, below are parameters to configure the secondary stack 304b:
1. rlc-BearerToAddModList=>RLC and MAC Logical-channel configuration is received from network using this Information Element (IE). This IE is a part of RRCReconfiguration message from a network.

For an embodiment, below are parameters shared to secondary cells for configuring secondary cell:
1. mac-LogicalChannelConfig=>MAC Logical channel configuration.
2. logicalChannelIdentity ID (LCDI): used for the Mapping of MAC logical channel and for the RLC bearers.
3. servedRadioBearer: SRB or DRB ID for mapping to RLC layer
4. rlc-Config: Contains RLC configures. Can be used if UE wants to configure RLC layer.
5. PHY Layer configuration: The current serving cell ID, Frequencyband, Bandwidth, BWP details are passed on to the second stack.
6. These details are part of 'spCellConfigCommon' IE (in case of NSA mode) or ServingCellConfigCommonSIB IE in SIB1 (in case of SA mode) which the network sends to UE.

Below are the RLC, MAC configuration
RRCReconfiguration-IEs::=SEQUENCE
{
rlc-BearerToAddModList SEQUENCE RLC-BearerConfig
}
RLC-BearerConfig::=SEQUENCE {
logicalChannelIdentity,
servedRadioBearer CHOICE {
srb-Identity SRB-Identity,
drb-Identity DRB-Identity
}
rlc-Config RLC-Config OPTIONAL, --Cond LCH-Setup
mac-LogicalChannelConfig logicalChannelConfig
. . . ,
}
Below is a Physical Layer config:
SIB1 {
ServingCellConfigCommonSIB
. . .
}
Reconfiguration WithSync::=
{spCellConfigCommon ServingCellConfigCommon Sharing RACH configuration for on-demand SI: For MSG1 based on-demand SI collision, primary stack will send the RACH configuration present in SI-RequestConfig in SIB1 to the secondary stack.
1. SI-SchedulingInfo: The IE SI-SchedulingInfo contains information needed for acquisition of SI messages. This is present in sib1
2. SI-RequestConfig: The IE SI-RequestConfig contains configuration for Msg1 based SI request Table 1 below describes examples of SI-RequestConfig and SI-RequestResources.

TABLE 1

```
SI-RequestConfig ::=          SEQUENCE {
    rach-OccasionsSI              SEQUENCE {
    rach-ConfigSI                     RACH-ConfigGeneric,
    ssb-perRACH-Occasion                   ENUMERATED {oneEighth, oneFourth, oneHalf,
one, two, four, eight, sixteen}
    }                                                OPTIONAL, -- Need
R
    si-RequestPeriod          ENUMERATED {one, two, four, six, eight, ten, twelve,
sixteen} OPTIONAL, -- Need R
    si-RequestResources           SEQUENCE (SIZE (1..maxSI-Message)) OF SI-
RequestResources
}
SI-RequestResources ::=       SEQUENCE {
    ra-PreambleStartIndex         INTEGER (0..63),
    ra-AssociationPeriodIndex     INTEGER (0..15)
OPTIONAL, -- Need R
    ra-ssb-OccasionMaskIndex          INTEGER (0..15)
OPTIONAL -- Need R
}
```

Sharing RACH configuration for RLF, UL SYNC, UL Grants:
  if rach-ConfigDedicated is not configured, 'rach-Config-Common' configuration is passed from the primary stack to secondary stack configuration. This configuration is present in SIB1.

Table 2 below describes an example of RACH-Config-Common.

TABLE 2

```
RACH-ConfigCommon ::=     SEQUENCE {
    rach-ConfigGeneric        RACH-ConfigGeneric,
    totalNumberOfRA-Preambles         INTEGER (1..63)
OPTIONAL, -- Need S
    ssb-perRACH-OccasionAndCB-PreamblesPerSSB CHOICE {
        oneEighth                 ENUMERATED
{n4,n8,n12,n16,n20,n24,n28,n32,n36,n40,n44,n48,n52,n56,n60,n64},
        oneFourth                 ENUMERATED
{n4,n8,n12,n16,n20,n24,n28,n32,n36,n40,n44,n48,n52,n56,n60,n64},
        oneHalf                   ENUMERATED
{n4,n8,n12,n16,n20,n24,n28,n32,n36,n40,n44,n48,n52,n56,n60,n64},
        one                       ENUMERATED
{n4,n8,n12,n16,n20,n24,n28,n32,n36,n40,n44,n48,n52,n56,n60,n64},
        two                       ENUMERATED {n4,n8,n12,n16,n20,n24,n28,n32},
        four                      INTEGER (1..16),
        eight                     INTEGER (1..8),
        sixteen                   INTEGER (1..4)
    }
```

IE RACH-ConfigDedicated is used to specify the dedicated random access parameters.
RACH-ConfigDedicated is passed to secondary stack if it is configured in RRCReconfiguration message inside 'Reconfigwithsync' IE by network.

Table 3 below describes an example of RACH-ConfigDedicated.

TABLE 3

```
RACH-ConfigDedicated ::=      SEQUENCE {
    cfra                  CFRA              OPTIONAL, --
Need S
    ra-Prioritization     RA-Prioritization   OPTIONAL,
-- Need N
    ...,
```

TABLE 3-continued

```
[[
ra-PrioritizationTwoStep-r16    RA-Prioritization    OPTIONAL,
-- Need N
cfra-TwoStep-r16                CFRA-TwoStep-r16     OPTIONAL
-- Need S
]]
}
```

In case of Beam failure recovery RACH, the configuration present in 'RACH-ConfigGeneric' is used from BeamFailureRecoveryConfig.

The UE 304 may receive the configurations of the physical layer entity on the primary stack as part of a "ServingCellConfigCommonSIB" Information Element (IE) present in a System Information Block 1 (SIB1). The UE 304 may receive the configurations of the MAC entity on the primary stack in one of, but not limited to, a Radio Resource Configuration (RRC) message, a MAC logical channel configuration, a logical channel identity, a served radio bearer, or the like.

The UE 304 may also perform a bearer split at the RLC entity for mapping one or more Dedicated Radio Bearers (DRBs) to logical channels on the secondary stack 304b to support the second RACH procedure.

On creating and configuring the secondary stack 304b, the UE 304 performs the first RACH procedure and the second RACH procedure on the primary stack 304a and the secondary stack 304b simultaneously.

The UE 304 disables the secondary stack upon successful completion of the second RACH procedure or the first RACH procedure. The UE 304 continues an ongoing second RACH procedure or the first RACH procedure on the primary stack 304a.

Various example embodiments herein describe the handling of the RACH procedure in multi-beam scenarios.

The UE 304 detects a requirement to connect to at least one element depending on an event triggered to perform the RACH procedure by the UE 304, while the UE 304 is connected to the at least one cell/BS 302 using at least one beam. In an embodiment, the at least one element refers to the cell/BS 302 or the beam. In an embodiment, the event triggered to perform the RACH procedure may be an event triggered to perform the RACH procedure to resume the one or more services on the at least one cell 302 including multiple beams. Such an event may be triggered due to at least one of, but is not limited to, a Beam Failure Recovery (BFR), an initial access, a Radio Link Failure (RLF), an UL synchronization, UL grants, or so on. In an embodiment, the event triggered to perform the RACH procedure may be an event triggered to select the cell among the plurality of different cells 302, when the UE 304 has valid RACH configurations of the plurality of different cells.

The UE 304 detects a first cell/beam 302 and a second cell/beam 302 including parameters satisfying cell selection criteria, when the UE 304 wants to connect to the at least one cell//beam. The parameters satisfying the cell selection criteria may include at least one of, but is not limited to, cell parameters, beam parameters, or so on.

The UE 304 enables the DAPS capability to create/initiate the secondary stack 304b. The UE 304 creates the secondary stack 304b by sharing at least one of, but not limited to, the configurations of the physical layer entity, the configurations of the MAC entity, the RACH configuration corresponding to the RACH procedure, or preamble information from the primary stack 304a to the secondary stack 304b. The UE 304 sends a RACH request to the primary stack 304a and the secondary stack 304b to perform the RACH procedure to connect on the at least two cells/beams 302 using both the primary stack 304a and the secondary stack 304b.

For sharing the preamble information from the primary stack 304a to the secondary stack 304b, the UE 304 identifies a type of the RACH procedure. The RACH procedure includes one of the CFRA procedure or the CBRA procedure. Based on the identified type of the RACH procedure, the UE 304 shares the preamble information from the primary stack 304a to the secondary stack 304b.

If the RACH procedure is the CFRA procedure, the UE 304 shares the dedicated preamble information from the primary stack 304a to the secondary stack 304b. The preamble information includes an element (cell/beam) identifier (ID) of the primary stack 304a, if a message 2 (MSG2) is failed at least once or Reference Signal Received Power (RSRP) is poor. The element ID includes one of a beam ID or a cell ID of the primary stack 304a.

If the RACH procedure is the CBRA procedure, the UE 304 shares the different sets of preamble information between the primary stack 304a and the secondary stack 304b. In an embodiment, for sharing the different sets of preamble information between the primary stack 304a and the secondary stack 304b, the UE 304 divides content-based preambles into a first set and a second set. The UE 304 allocates the first set for the primary stack 304a and the second set for the secondary stack 304b. In an embodiment, for sharing the different sets of preamble information between the primary stack 304a and the secondary stack 304b, the UE 304 divides the content-based preambles into an even set of preambles and an odd set of preambles. The UE 304 allocates the even set of preambles for the primary stack 304a and the odd set of preambles for the secondary stack 304b. In an embodiment, for sharing the different sets of preamble information between the primary stack 304a and the secondary stack 304b, the UE 304 dynamically shares the currently used preamble information from the primary stack 304a to the secondary stack 304b. The UE 304 enables the secondary stack 304b to use the shared preamble information only on receiving a subsequent notification. The preamble information includes the beam ID of the primary stack. The shared preamble information for the secondary stack is valid only until an expiry of a Random-Access Response (RAR) window.

The UE 304 initiates the RACH procedure on the first cell/beam 302 and the second cell/beam 302 using the primary stack 304a and the secondary stack 304b simultaneously.

The UE 304 aborts the ongoing RACH procedure using the secondary stack 304b, if the RACH procedure using the primary stack 304a is completed before completion of the RACH procedure using the secondary stack 304b. The UE 304 aborts the ongoing RACH procedure using the primary stack 304a, if the RACH procedure using the secondary stack 304b is completed before completion of the RACH procedure using the primary stack 304a.

The UE 304 disables the secondary stack 304b, upon successful completion of the RACH procedure using any of the primary stack 304a or the secondary stack 304b.

FIGS. 3A, 3B, and 3C show example blocks of the wireless network 300, but it is to be understood that embodiments are not limited to the blocks shown in these figures. In various embodiments, the wireless network 300 may include fewer or more blocks. Further, the labels or names of the blocks are used only for illustrative purposes and do not limit the scope of embodiments herein. One or more blocks may be combined together to perform same or substantially similar function in the wireless network 300.

Figure 4:
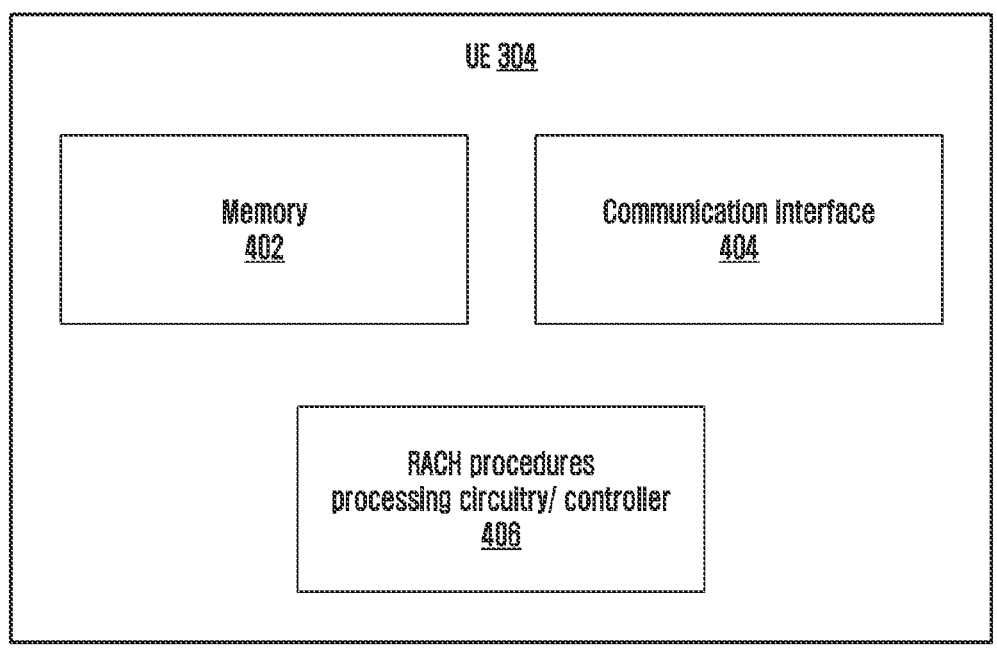
FIG. 4 is a block diagram depicting components of an example UE for managing multiple RACH procedures, according to various embodiments.

FIG. 4 is a block diagram depicting components of the example UE 304 for managing the RACH procedures, according to various embodiments. The UE 304 includes a memory 402, a communication interface 404, and/or a RACH procedures processing circuitry/controller 406. The UE 304 may also include a Radio Frequency (RF) transceiver, signal processing circuitry, an Input/Output ports, a display, and so on (not shown).

The memory 402 stores information about at least one of the primary stack 304a, the secondary stack 304b, the RACH configurations, the configurations of the physical layer entity, the MAC layer entity, and the RLC layer entity, the preamble information, or so on. Examples of the memory 402 may be, but are not limited to, NAND, embedded Multimedia Card (eMMC), Secure Digital (SD) cards, Universal Serial Bus (USB), Serial Advanced Technology Attachment (SATA), solid-state drive (SSD), and so on. Further, the memory 402 may include one or more computer-readable storage media. The memory 402 may include one or more non-volatile storage elements. Examples of such non-volatile storage elements may include Random Access Memory (RAM), Read Only Memory (ROM), magnetic hard discs, optical discs, floppy discs, flash memories, or forms of electrically programmable memories (EPROM) or electrically erasable and programmable (EEPROM) memories. In addition, the memory 402 may, in some examples, be considered a non-transitory storage medium. The term "non-transitory" may, for example, indicate that the storage medium is not embodied in a carrier wave or a propagated signal. However, the term "non-transitory" should not be interpreted to mean that the memory is non-movable. In certain examples, a non-transitory storage medium may store data that may, over time, change (e.g., in Random Access Memory (RAM) or cache).

The communication interface 404 (e.g., including communication interface circuitry) may be configured to enable the UE 304 to communicate with at least one BS 302 using an interface supported by the respective RAT. Examples of the interface may be, but are not limited to, a wired interface, a wireless interface, or any structure or circuitry supporting communications over a wired or wireless connection.

The term 'controller/processing circuitry' may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. For example, the controller 406 may include at least one of a single processer, a plurality of processors, multiple homogeneous or heterogeneous cores, multiple Central Processing Units (CPUs) of different kinds, microcontrollers, special media, or other accelerators.

The controller 406 may be configured to handle the RACH procedures on the UE 304.

In an embodiment, the controller 406 may handle the different RACH procedures on the UE 304. The controller 406 detects the triggering of the first RACH procedure on the primary stack 304a, while the UE 304 is connected to the at least one cell 302 in the wireless network 300. The controller 406 detects the triggering of the second RACH procedure while the first RACH procedure is ongoing. The second RACH procedure may be different from the first RACH procedure. The controller 406 uses the DAPS capability to create/initiate the secondary stack 304b for handling the second RACH procedure. On creating the second RACH procedure, the controller 406 performs the first RACH procedure and the second RACH procedure on the primary stack 304a and the secondary stack 304b simultaneously. The controller 406 disables the secondary stack 304b upon successful completion of the second RACH procedure.

In an embodiment, the controller 406 is configured to handle the RACH procedure, while the UE 304 is connected to the at least one cell 302 using at least one beam.

The controller 406 detects the requirement to connect to the at least one cell/beam 302 depending on the event triggered to perform the RACH procedure by the UE 304, while the UE 304 is connected to at least one cell 302 using the at least one beam. The controller 406 detects the first cell/beam and the second cell/beam including the parameters satisfying the cell selection criteria, when the UE 304 wants to connect to the at least one cell/beam 302.

The controller 406 enables the DAPS capability to create/initiate the second stack 304b. The controller 406 initiates the RACH procedure on the first cell/beam and the second cell/beam using the primary stack 304a and the secondary stack 304b simultaneously. The controller 406 aborts the ongoing RACH procedure using the secondary stack, if the RACH procedure using the primary stack 304a is completed before completion of the RACH procedure using the secondary stack or vice-versa. The controller 406 disables the secondary stack 304b, upon successful completion of the RACH procedure using any of the primary stack 304a or the secondary stack 304b.

FIG. 4 shows example blocks of the UE 304, but it is to be understood that embodiments are not limited in this respect. In various embodiments, the UE 304 may include fewer or more blocks. Further, the labels or names of the blocks are used only for illustrative purposes and do not limit the scope of embodiments herein. One or more blocks may be combined together to perform same or substantially similar function in the UE 304.

Figure 5:
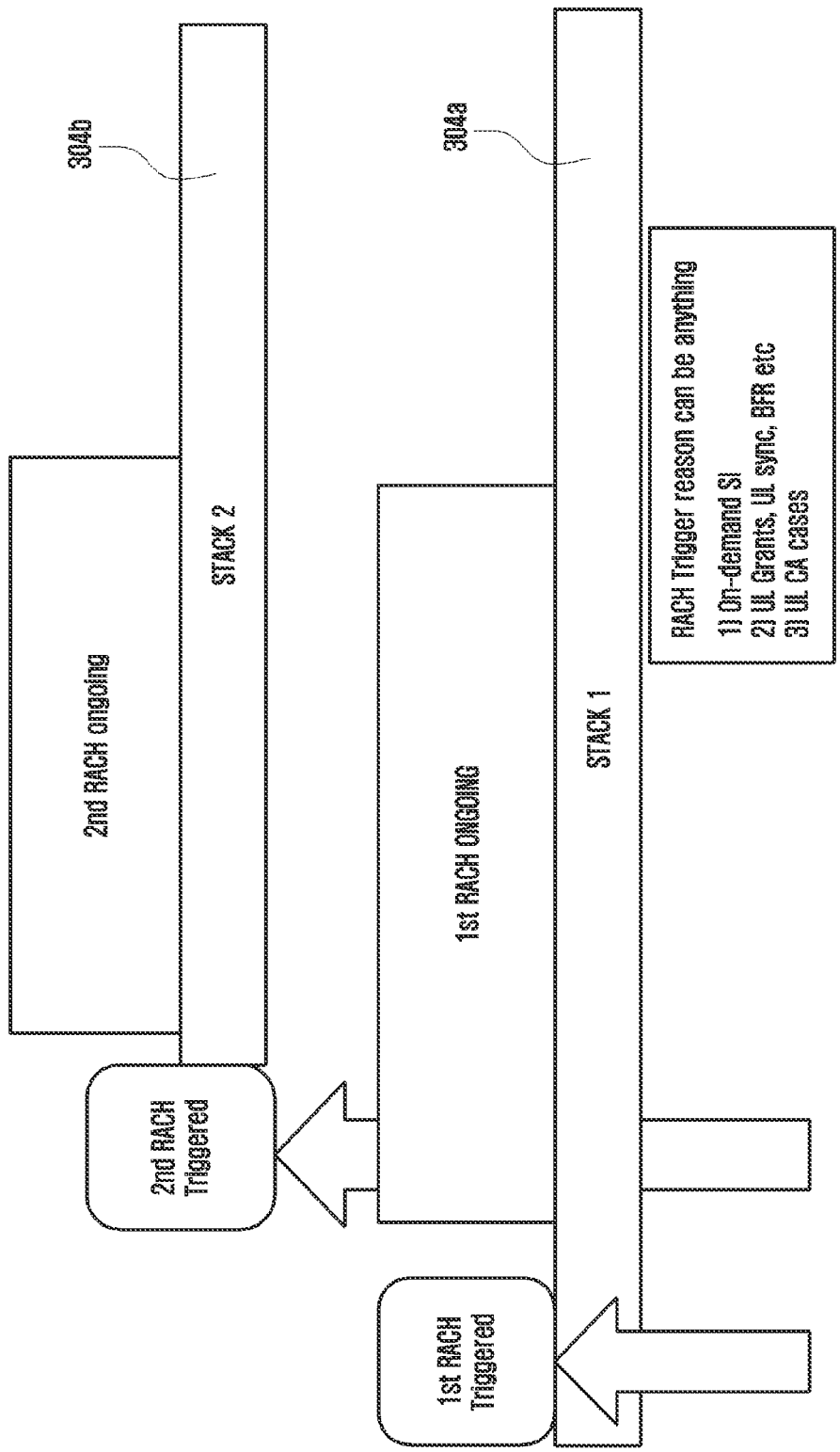
FIG. 5 is a diagram depicting an example use case scenario of performing the different RACH procedures, according to various embodiments.

FIG. 5 is a diagram depicting an example use case scenario of performing the different RACH procedures, according to various embodiments.

Consider an example scenario, wherein the UE 304 initiates the first RACH procedure on the primary stack 304a. While the first RACH procedure is ongoing on the primary stack 304a, the UE 304 detects the trigger for the second RACH procedure due to at least one of, the on-demand SI request, the UL grants, the UL CA scenarios, and so on.

On detecting the trigger for the second RACH procedure, the UE 304 creates the secondary stack 304b by enabling the DAPS capability. The UE 304 performs the first RACH procedure and the second RACH procedure on the primary stack 304a and the secondary stack 304b, simultaneously.

Figure 6:
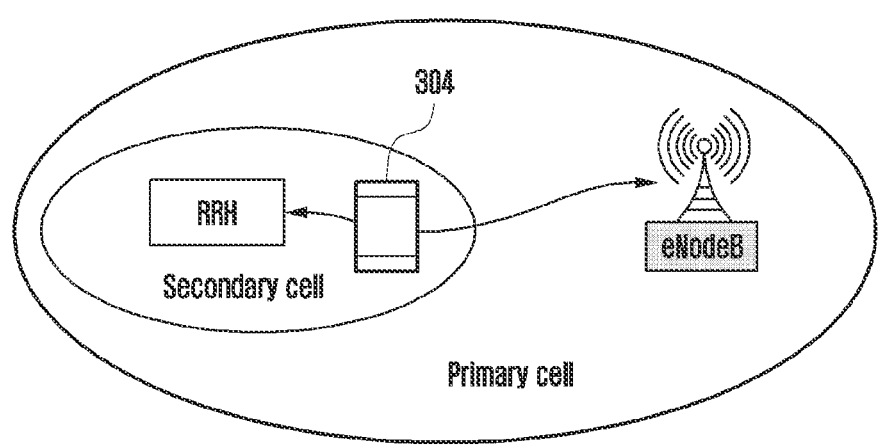
FIG. 6 is a diagram depicting example use case scenarios of handling a second RACH procedure, on detecting the collision of the second RACH procedure with an ongoing first RACH procedure, according to various embodiments.

FIG. 6 is a diagram depicting example use case scenarios of handling the second RACH procedure, on detecting the collision of the second RACH procedure with the ongoing first RACH procedure, according to various embodiments.

Consider an example scenario, wherein the RACH procedure for the UL data (i.e., the first RACH procedure) is ongoing on the primary stack (a stack 1). While the RACH procedure for the UL data is ongoing, the UE 304 detects the triggering of a RACH procedure for the on-demand SI (i.e., the second RACH procedure). The RACH procedure for the on-demand SI may be triggered for SIB's based configurations such as, but not limited to, side link configurations, V2X/D2D configurations, and cell reselection (intra, inter frequency, and the RAT). In such a scenario, the UE 304 creates the secondary stack 304b using the DAPS capability. The UE 304 performs the RACH procedure for the UL data on the primary stack 304a and the RACH procedure for the on-demand SI on the secondary stack 304b simultaneously.

Consider another example scenario, wherein the UE 304 initiates the RACH procedure (for example, the first RACH procedure) on the secondary cell/Scell (belonging to the sTAG) using the primary stack 304a. While the RACH procedure is ongoing on the Scell, the UE 304 identifies the triggering of a RACH procedure on the primary cell/Pcell (belonging to the pTAG). In such a scenario, delaying the RACH procedure on the Pcell may cause delay in the services on the Pcell. For example, when the UE 304 requires the grants for sending the UL data on the Pcell, the UE 304 may not be able to send the UL data, until the completion of the ongoing RACH procedure on the Scell. When the critical data on the Pcell requires the RACH for the UL synchronization or the UL grants, and when the RACH for the Scell is ongoing, the UL data on the Pcell may be delayed till the RACH on the Scell is completed. Thus, in order to avoid delaying of the RACH procedure, the UE 304 creates the secondary stack 304b using the DAPS capability. The UE 304 performs the RACH procedure on the Pcell using the secondary stack 304b. Thus, helping the UE 304 to trigger the Pcell RACH immediately without having to wait for the Scell RACH to be completed.

Figure 7:
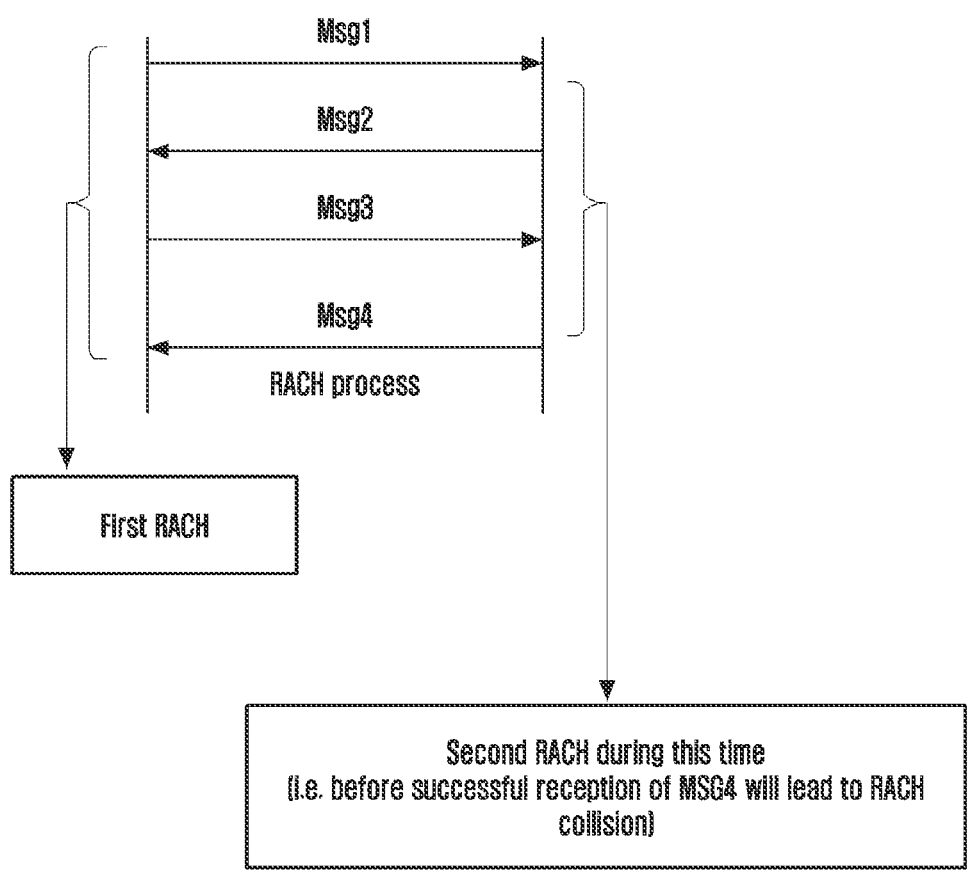
FIG. 7 is a diagram depicting an example identification of the collision of the two RACH procedures, according to various embodiments.

FIG. 7 is a depicting example identification of the collision of the two RACH procedures, according to various embodiments.

When the first RACH procedure on the MAC entity has initiated/started and not completed all 4 steps of the RACH procedure (as defined the 3GPP specification) by the time the second RACH procedure is triggered on the same MAC entity (same cell or the different cell, in case of the UL-CA scenarios), the UE 304 identifies that initiating the second RACH procedure on the same MAC entity may lead to the RACH collision.

Also, there may be a possibility of message (MSg)1/MSg2/Msg3/Msg4 failures. In such cases, the UE 304 observes the multiple corresponding messages being transmitted and may take more time to complete the RACH procedure.

Figure 8A:
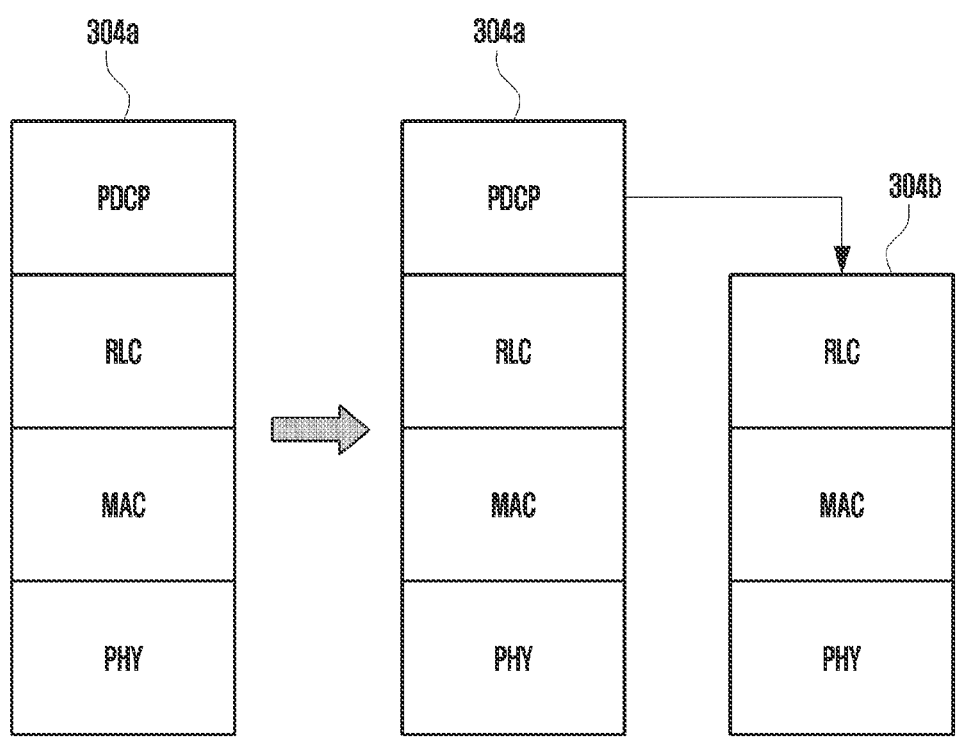
FIG. 8A depicts an example configuring process of a secondary stack, according to various embodiments.
Figure 8B:
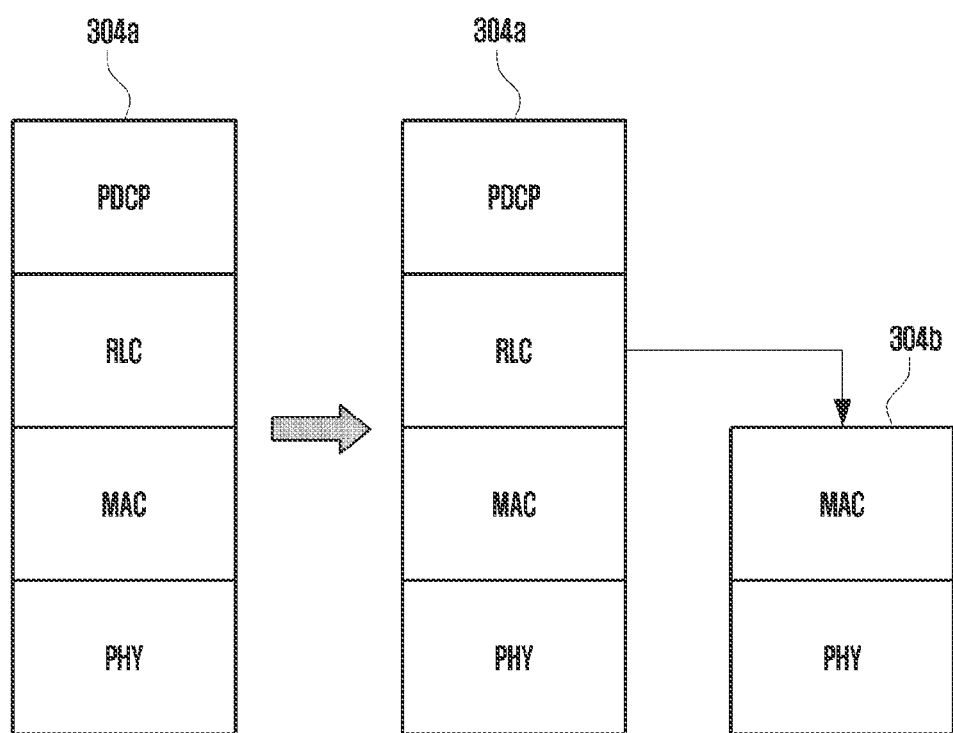
FIG. 8B depicts an example configuring process of a secondary stack, according to various embodiments.

FIG. 8A and FIG. 8B depict an example configuring process of the secondary stack 304b, according to various embodiments.

The UE 304 creates the secondary/new stack 304b using the DAPS capability, on detecting the collision of the first RACH procedure with the second RACH procedure. In an example, the UE 304 may create the secondary stack 304b like when the UE 304 is powered on. The secondary stack 304b may include the physical layer entity, the MAC layer entity, and the RLC layer entity (the optional entity). The configurations of the physical layer entity of the secondary stack 304b (for example, a frequency, a band, bandwidth, a physical cell ID, Bandwidth part (BWP), and so on) may be same as the configurations of the physical layer entity on the primary stack 304a. The UE 304 may receive the configurations of the physical layer entity as a part of a 'ServingCellConfigCommonSIB' IE present in 'SIB1' received on the primary stack 304a. The UE 304 shares the configurations of the physical layer entity from the primary stack 304a to the secondary stack 304b to configure the physical layer entity on the secondary stack 304b. Unlike, a handover case, where secondary stack target details are given by the network/BS 302, the UE 304 receives the configurations of the physical layer entity from the primary stack 304a.

The configurations of the MAC layer entity and the RLC entity of the secondary stack 304b are same as the primary stack 304a. The UE 304 may receive the configurations of the MAC layer entity, and the RLC layer entity from the BS 302/network using the "RRCReconfiguration message". Alternatively, the UE 304 may receive the configurations of the MAC layer entity, and the RLC layer entity from 'mac-LogicalChannelConfig', logicalChannelIdentity ID and servedRadioBearer. The UE 304 passes the configurations of the MAC layer entity and the RLC entity of the primary stack 304a to the secondary stack 304b to configure the MAC layer entity and the RLC layer entity on the secondary stack 304b.

The UE 304 may share the configurations of the RLC layer entity (rlc-Config configuration) from the primary stack 304a to the secondary stack 304b, only if the configurations of the RLC layer entity are required.

The secondary stack 304b may be used for only the RACH procedure. Once the RACH procedure is completed, the secondary stack 304b may be deactivated. Thus, in an embodiment, a lightweight secondary stack has been created, wherein the split may be performed at the RLC layer entity. The secondary stack may have only the MAC layer entity and the physical layer entity. The splitting at the RLC layer entity may also help the UE 304 to save resources (for example, the memory 402, a CPU clock, processing, or the like) used of extra RLC layer entity/protocol.

Once the secondary stack 304b is created, the UE 304 passes the RACH trigger configurations/RACH configurations corresponding to the second RACH procedure from the primary stack 304a to the secondary stack 304b. The UE 304 may receive the RACH trigger configurations as a part of the SIB1 or the RRCReconfiguration message based on the trigger reason and network configuration. Depending on the trigger reason, the UE 304 shares only the corresponding RACH trigger configurations to the secondary stack 304b from the primary stack 304a.

For example, if the second RACH procedure for the on-demand SI is triggered and the primary stack 304a may already have an on-demand SI RACH configuration (an example of the RACH trigger configuration) received from the network/BS 302. In such a scenario, the on-demand SI RACH configuration may be passed onto the secondary stack 304b from the primary stack 304a, thus saving the secondary stack processing/time in obtaining the RACH trigger configuration from the network/BS 302 again.

Once the secondary RACH procedure is triggered and completed successfully, the secondary stack 304b informs the primary stack 304a about the triggered second RACH procedure. The secondary stack 304b may also share timing advance details to the primary stack 304a in case the secondary stack 304b is triggered for the UL sync/RLF/BFR scenario. Then, the primary stack 304a deactivates the secondary stack 304b.

Thus, in embodiments herein, the UE 304 creates the secondary stack 304b only for the RACH procedure. Once the RACH procedure is completed, the UE 304 deactivates the secondary stack 304b unlike the typical DAPS used in the HO, where the data may continue on a target cell. When the split is at the RLC layer entity, the DRB may be mapped to logical channels on the secondary stack 304b like on the primary stack 304a. In an example, as shown in the FIG. 8A, the split is at the PDCP, providing a typical secondary stack 304b used in the dual connection and DAPS scenarios. As shown in the FIG. 8B, the split is at the RLC, providing a light weight secondary stack to support only RACH.

Figure 9:
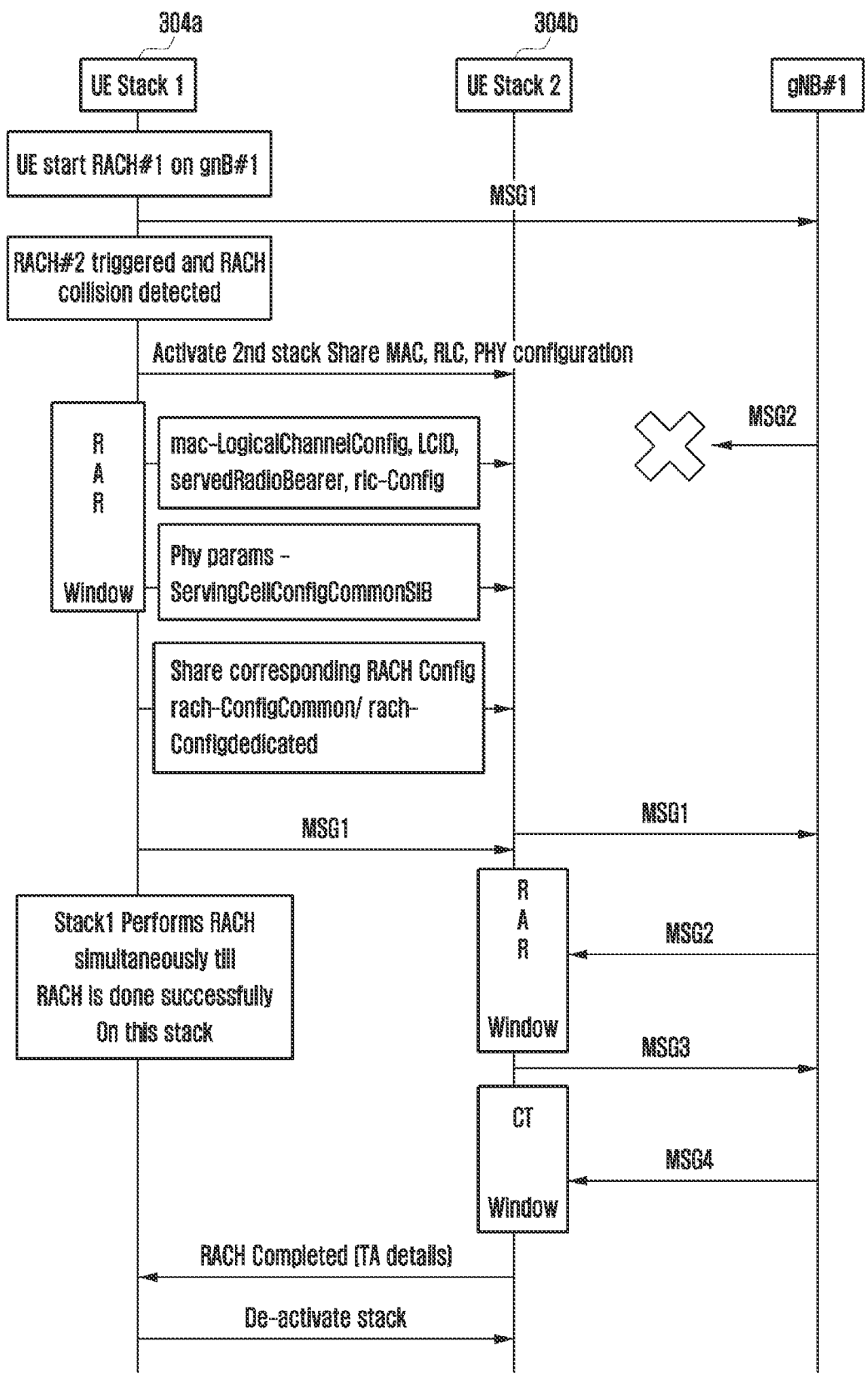
FIG. 9 depicts an example call flow, which may be used on all types of RACH type triggers, according to various embodiments.

FIG. 9 depicts an example call flow, which may be used on all types of RACH type triggers, according to various embodiments.

As depicted in FIG. 9, a RAR window indicates a time period, wherein the UE 304 is expected to receive a MSG2 from the network/BS 302 when the RACH procedure is ongoing. A CT window may be a time period, wherein the UE 304 is expected to receive a MSG4 from the network/BS 302. The UE 304 may receive the RAR window and the CT window from the network/BS 302 as the part of the RACH configuration.

In an embodiment, the UE 304 starts RACH #1 on gnB #1 and RACH #2 is triggered and RACH collision is detected. The UE 304 activates the second stack 304b and share MAC, RLC, PHY configuration to the second stack 304b. If the UE 304 identifies the second RACH procedure during the RAR window of the first RACH procedure, the UE 304 creates the secondary stack 304b using the DAPS capability. The UE 304 performs the first RACH procedure and the second RACH procedure on the primary stack 304a (a UE stack 1) and the secondary stack 304b (a UE stack 2) simultaneously. If the UE 304 receives the MSG4 from the network/BS 302 during the CT window of the second RACH procedure, the UE 304 deactivates/disables the secondary stack 304b.

Figure 10:
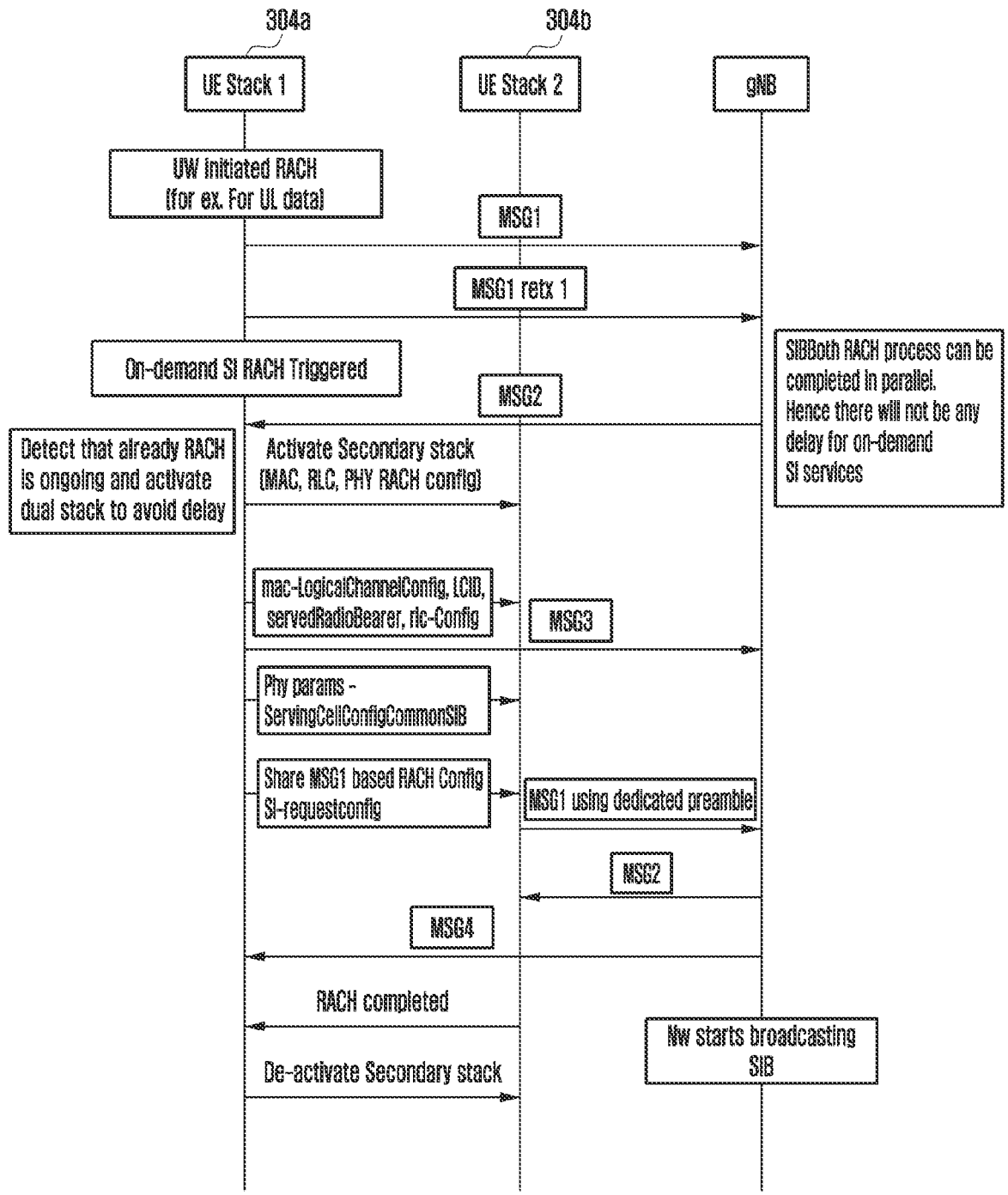
FIG. 10 depicts an example call flow for handling the multi-RACH trigger for a contention free RACH (CFRA) procedure during an on-demand System Information (SI) scenario, according to various embodiments.

FIG. 10 depicts an example call flow for handling the multi-RACH trigger for the CFRA procedure during an on-demand SI scenario, according to various embodiments.

As depicted in FIG. 10, the UE 304 identifies the triggering of the second RACH procedure before receiving the MSG4 from the network/BS 302 when the first RACH procedure is ongoing with the network/BS 302. In such a scenario, the UE 304 activates the secondary stack 304b/dual stack using the DAPS capability. The UE 304 completes the first RACH procedure and the second RACH procedure on the primary stack 304a and the secondary stack 304b simultaneously/in parallel. On completing the second RACH procedure, the UE 304 deactivates the secondary stack 304b, thus avoiding the delay in receiving the on-demand services.

Figure 11:
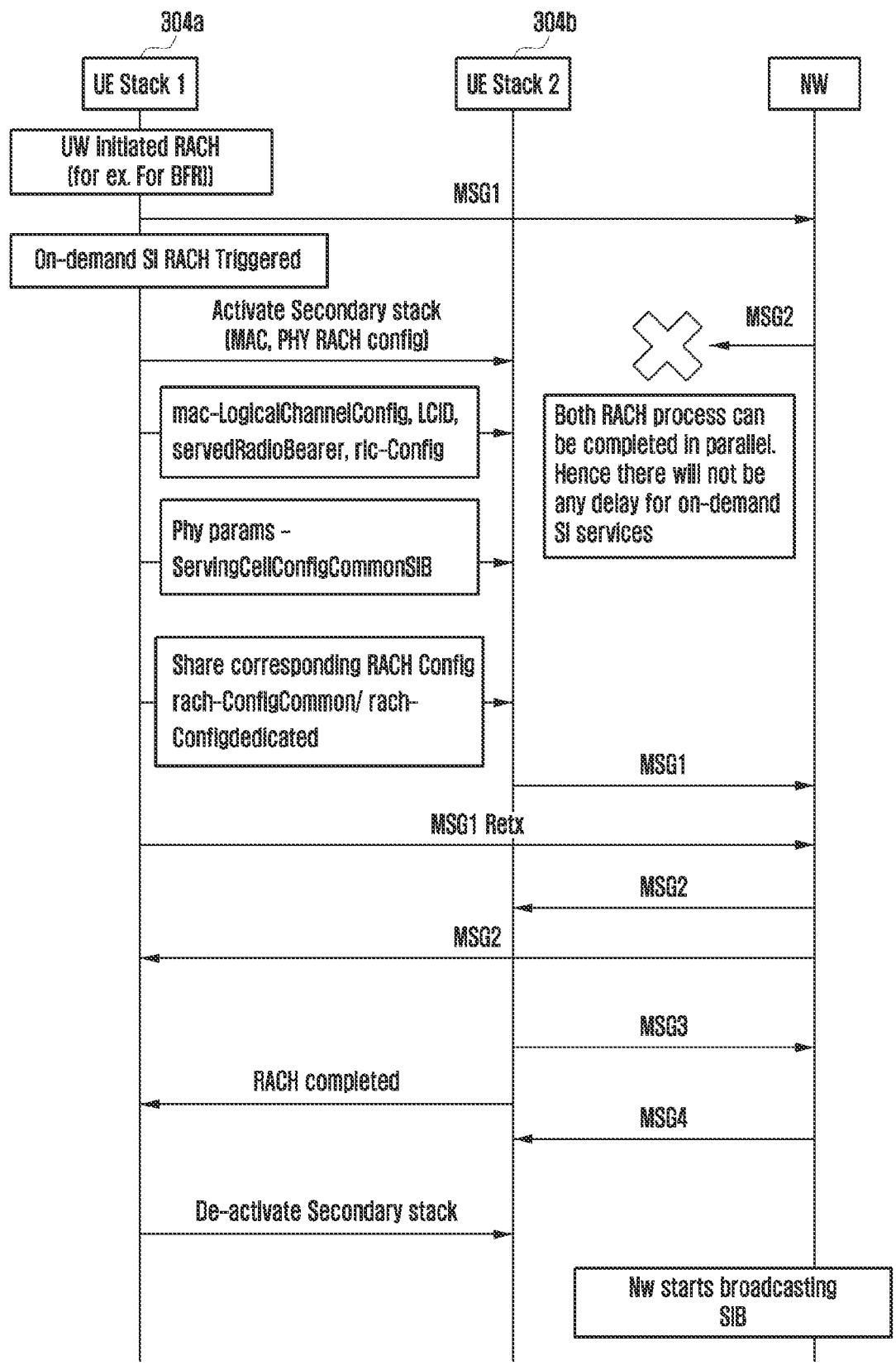
FIG. 11 depicts an example call flow for handling the multi-RACH trigger for a contention-based RACH (CBRA) procedure during the on-demand SI scenario, according to various embodiments.

FIG. 11 depicts an example call flow for handling the multi-RACH trigger for the CBRA procedure during the on-demand SI scenario, according to various embodiments.

As depicted in FIG. 11, the UE 304 identifies the triggering of the second RACH procedure before receiving the MSG2 from the network/BS 302 when the first RACH procedure is ongoing with the network/BS 302. In such a scenario, the UE 304 activates the secondary stack 304b/dual stack using the DAPS capability. The UE 304 completes the first RACH procedure and the second RACH procedure on the primary stack 304a and the secondary stack 304b simultaneously/in parallel. On completing the second RACH procedure, the UE 304 deactivates the secondary stack 304b.

Figure 12:
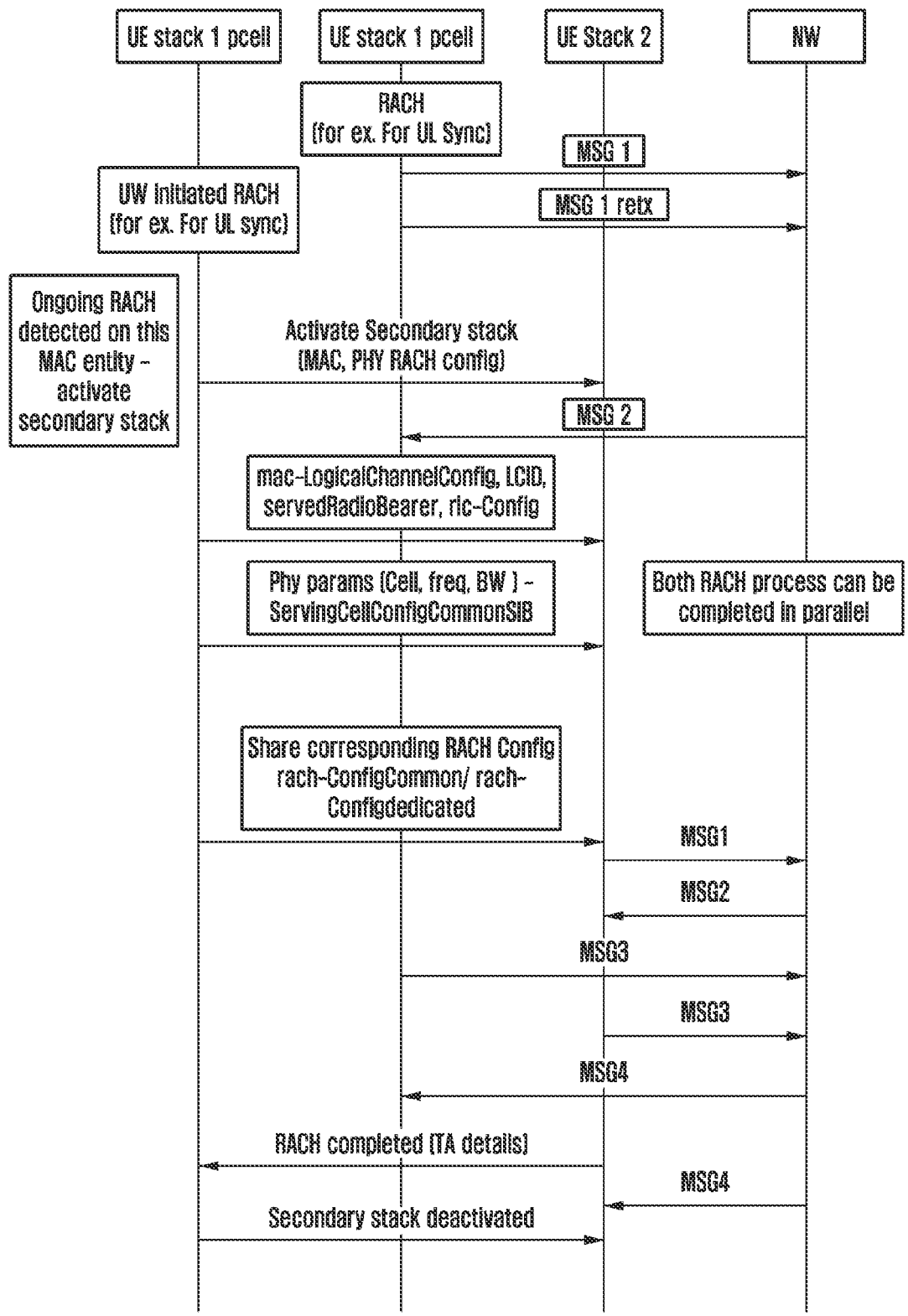
FIG. 12 depicts an example call flow for handling the RACH collisions during an uplink (UL) Carrier Aggregation (CA) scenario, according to various embodiments.

FIG. 12 depicts an example call flow for handling the RACH collisions during the UL CA scenario, according to various embodiments.

As depicted in FIG. 12, the UE 304 may identify the collision of the two RACH procedures, when the second RACH procedure is triggered on the MAC entity on which the first RACH procedure is ongoing. In such a scenario, the UE 304 activates the secondary stack 304b/dual stack using the DAPS capability. The UE 304 completes the first RACH procedure and the second RACH procedure on the primary stack 304a and the secondary stack 304b simultaneously/in parallel. On completing the second RACH procedure, the UE 304 deactivates the secondary stack 304b.

Figure 13:
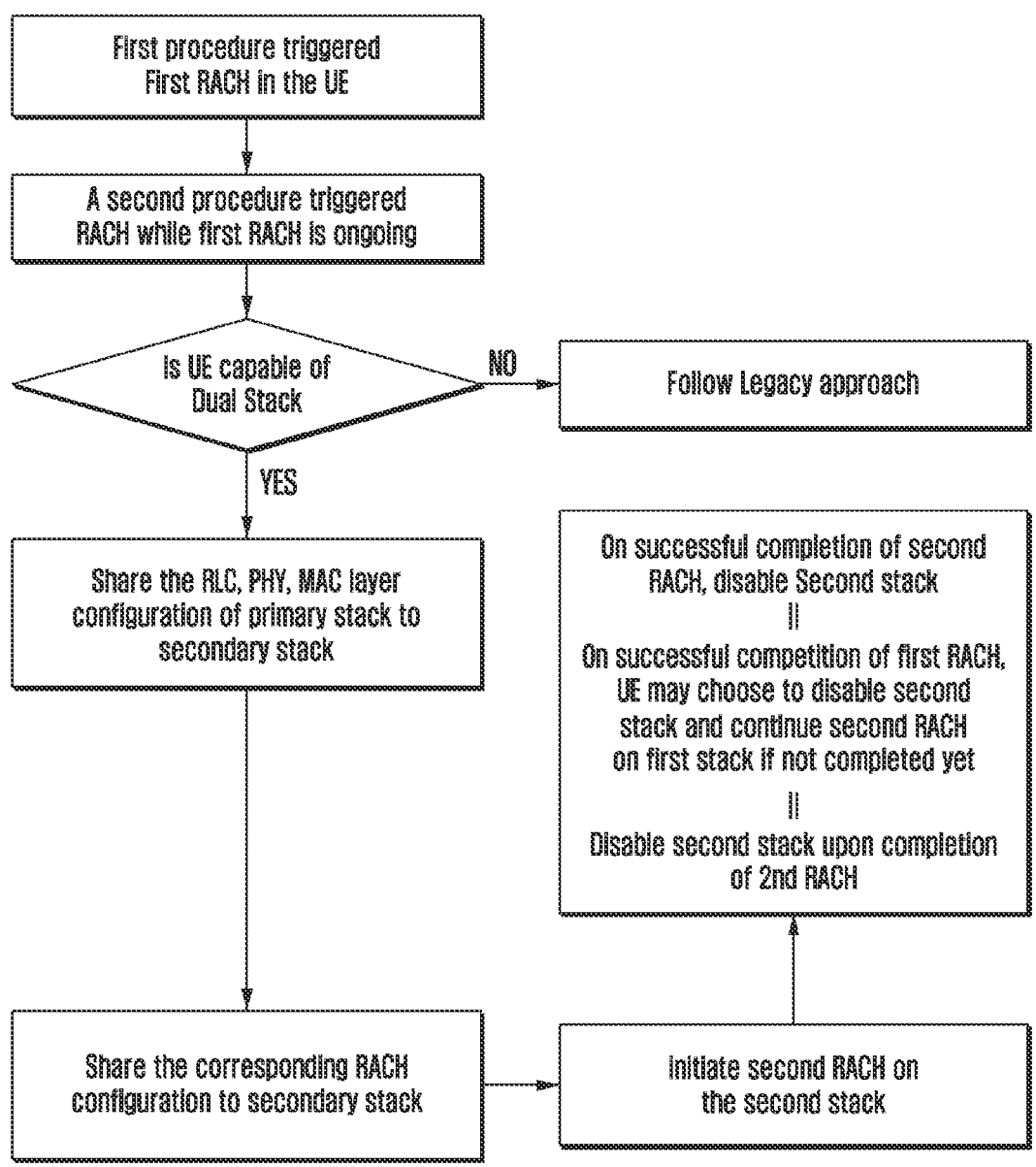
FIG. 13 is a flowchart depicting an example process/method for handling the multiple RACH triggers, according to various embodiments.

FIG. 13 is a flowchart depicting an example process/method for handling the multiple RACH triggers, according to various embodiments.

Figure 14A:
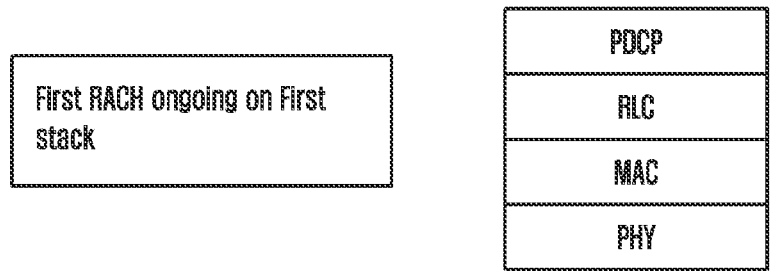
FIG. 14A is a diagram depicting example activation and deactivation of the secondary stack for performing the multiple RACH procedures, according to various embodiments.
Figure 14B:
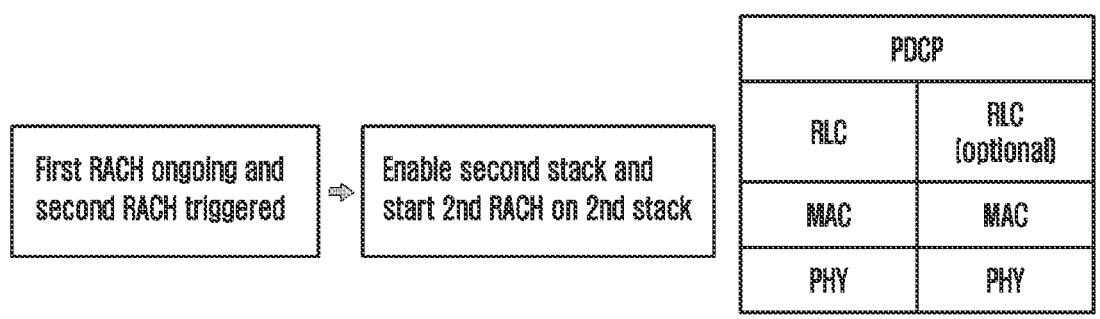
FIG. 14B is a diagram depicting example activation and deactivation of the secondary stack for performing the multiple RACH procedures, according to various embodiments.
Figure 14C:
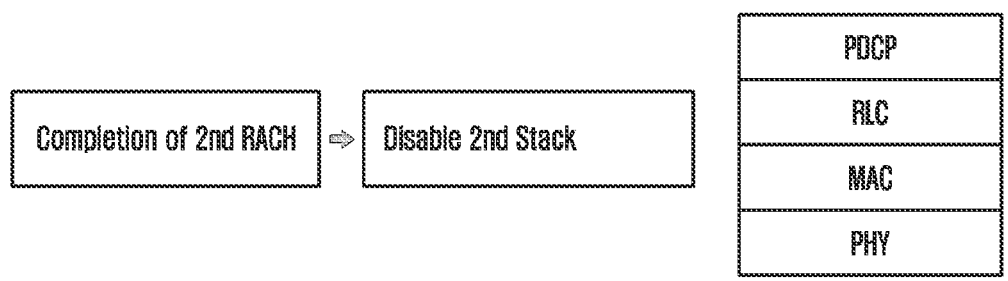
FIG. 14C is a diagram depicting example activation and deactivation of the secondary stack for performing the multiple RACH procedures, according to various embodiments.

On the second RACH procedure being triggered while the first RACH procedure is ongoing on the primary stack 304a (as depicted in FIG. 14A), the UE 304 checks if the UE 304 is capable of the dual stack/DAPS. If the UE 304 is not capable of the dual stack, the UE 304 follows a legacy approach. If the UE 304 is capable of the DAPS, the UE 304 shares the configurations of the RLC layer entity, the physical layer (PHY) entity, and the MAC entity from the primary stack 304a to the secondary stack 304b. The UE 304 also shares the RACH trigger configurations/RACH configuration corresponding to the second RACH procedure with the secondary stack 304b. The UE 304 initiates the secondary RACH procedure on the secondary stack (as depicted in FIG. 14B). On completion of the second RACH procedure, the UE 304 disables the secondary stack 304b (as depicted in FIG. 14C). On successful completion of the first RACH procedure, the UE 304 may choose to disable the secondary stack 304b and continue the secondary RACH procedure on the first stack 304a (if the second stack has not yet been completed).

Consider an example scenario, wherein the UE 304 receives the request for V2X or D2D or any specific services, which require the on-demand SI request. If the wireless network 300 is a NR network, then only SIB1 is mandatorily broadcasted by the BS/network 302 and all the other SIBs may be configured to be acquired by the UE 304 using an on-demand SI process. As of 38.331 V16.2, there may be 14 SIBs defined, so there is a possibility for the UE 304 to acquire the SIB2 to SIB 14 via the on-demand-SI request. So, the UE triggers the RACH #1 procedure (the first RACH procedure) on a NR cell #1 (RACH #1, cell #1, Trigger reason on-demand SI). In an example herein, during the RACH #1 procedure, the UE 304 has some uplink data to send to the BS 302 and the UE 304 has to trigger the RACH procedure process for the uplink synchronization. (i.e., RACH #2, cell #1, trigger reason UL_SYNC). In another example herein, during the RACH #1 procedure, the UE 304 has some uplink data to send to the BS 302 and there are no grants currently available for the UE 304 to send the uplink data, which may eventually lead the UE 304 to trigger the RACH procedure on the cell 1 (i.e., RACH #2, cell #1, Trigger Reason is UL_Grants).

The UE 304 configured with the UL-CA triggers the RACH #1 on the primary cell #1 for the uplink synchronization (RACH #1, cell #1, Trigger Reason UL_Grants). During the first RACH procedure, there may be a trigger for the second RACH on the secondary cell for the uplink synchronization (RACH #2, cell #2, Trigger reason UL_SYNC). In the UL-CA, all the multiple cells may have the single MAC entity). As per the 3GPP specification 38.331-5.1.1, since there is no possibility of having 2 RACH at same time by UE 304 on the single MAC entity, there may be a delay on the RACH #2, as the second RACH procedure may be started only upon completion of the first RACH.

In contrast, various embodiments disclosed herein enable the UE to overcome the restriction of single RACH procedure in the RAT at an instance using DAPS possibility effectively. In NR, there may a possibility of multiple RACH triggers when a RACH procedure is currently ongoing. In such scenarios, the UE 304 may trigger the second RACH procedure on the secondary stack 304b while the first RACH procedure is ongoing. Thus, reducing the delay of having to wait for the completion of the first RACH.

Various embodiments disclosed herein initiate the secondary stack 304b when the RACH collision is detected to perform the two RACH procedures simultaneously and avoid the delay for the second RACH services, which may be completely initiated and controlled by the UE itself. In an embodiment:
1. The DAPS may be released by the UE 304 upon completion of the RACH procedure;
2. Both the primary stack and the secondary stack may be latched to the same cell/BS 302;
3. the RACH configurations may be shared to the secondary stack by the primary stack itself;
4. the two RACH may be performed simultaneously using the primary cell RACH configuration on the same cell/BS 302; and
5. the secondary stack may be initiated using the same configuration of the primary cell.

Figure 15:
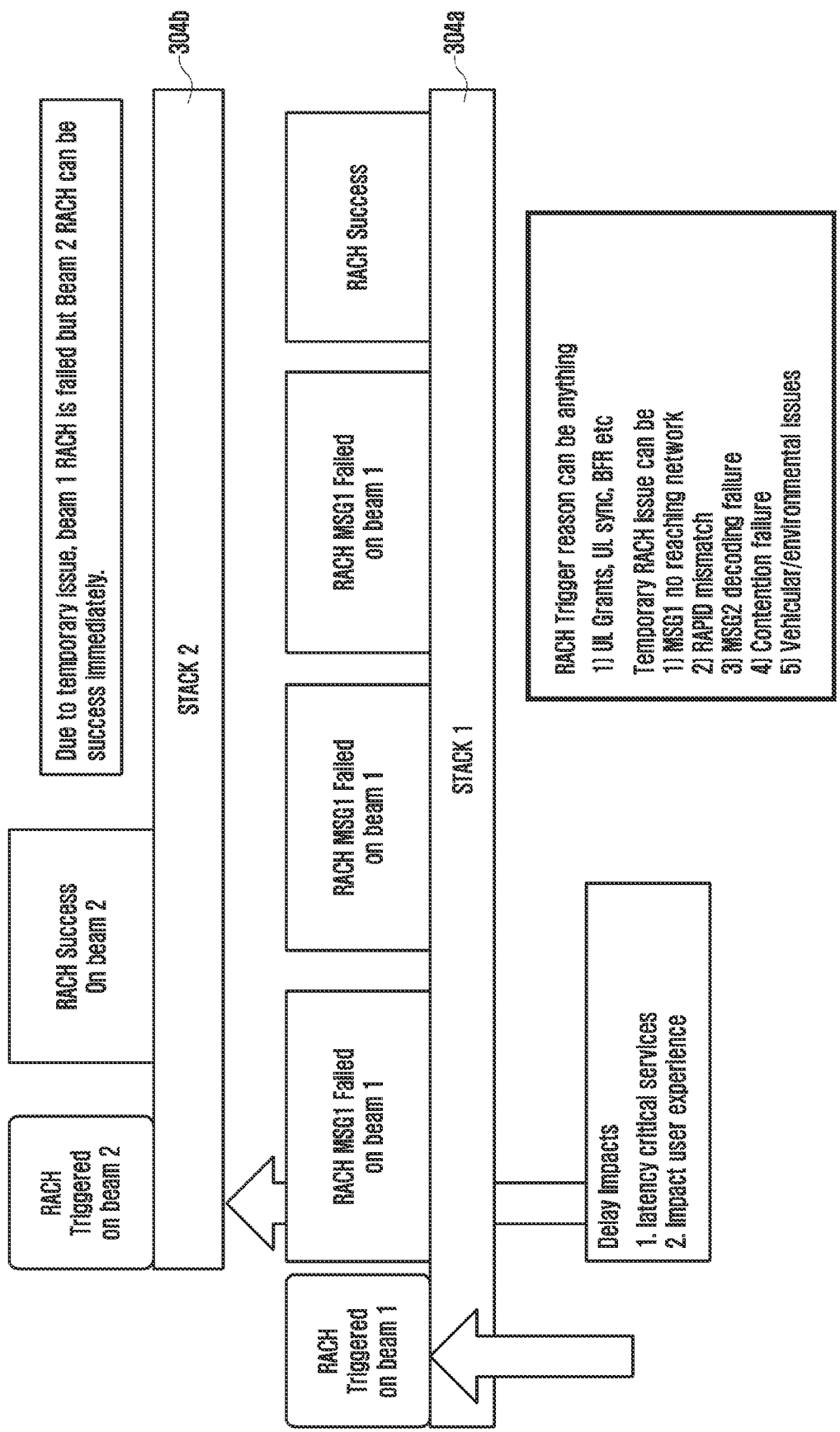
FIG. 15 is a diagram depicting example handling of the RACH procedure in multiple/multi-beam scenarios, according to various embodiments.

FIG. 15 is a diagram depicting example handling of the RACH procedure in the multiple/multi beam scenarios, according to various embodiments.

The UE 304 may handle the RACH procedure in the following scenarios:

Single Cell/BS 302 with Multiple Beams:
1. Beam Failure Recovery (BFR): During the BFR, the UE 304 has to perform the two same RACH procedures simultaneously on the two candidate beams. The RACH resources and the candidate beam to use during a recovery from the beam failure may be known to the UE 304 in advance, which may be an ideal scenario for the UE 304 to initiate the dual stack/DAPS itself without network intervention for performing the two RACH procedures simultaneously. Performing the two same RACH procedures simultaneously may help the UE 304 to recover from the beam failure and resume the data activity with the cell/BS 302 with less interruption to the user. Even when the RACH procedure on one of the beams fails, the other RACH procedure may be success and allow the UE 304 to resume the data services quickly.
2. Initial access, RLF, UL grants, UL sync, or the like: For UE's operating in greater than 6 Giga Hertz (6 GHz) frequency range, there may be possibility of up to 64 beams. Thus, there may be a temporary network, and environmental issues such as, but not limited to, vehicle blockage, or the like. Such issues may block the beam temporarily and may delay the RACH procedure on the respective beam. Thus, in such scenarios, the UE 304 may use the DAPS capability to active the dual stack (i.e., the primary stack 304a and the secondary stack 304b) by itself without network intervention and to trigger the two same RACH procedures on the two different beams, thereby helping the UE to overcome from the temporary issues on some of the beams, which further enables the UE to complete the RACH procedure at a faster rate.

Multi-Cell Scenario:
1. 2 different cells during an initial access: when the UE 304 has a valid RACH configuration of two different cells/BSs 302, the UE 304 may exploit the multiple stacks to trigger the RACH on the multiple cells/BSs 302. Thus, during the initial access, the UE 304 may access the cell 302 on which the RACH may be successfully completed first. Further, at a cell edge, where the UE 304 have poor signal coverage/unlicensed spectrum on multiple cells may be very beneficial.

Thus, in general, various embodiments disclosed herein may be used any time when the RACH procedure is predicted to be triggered in the UE 304. Also, handling the multiple RACH procedure may be useful in an unlicensed spectrum also, where the UE 304 has to do "listen before talk" for every uplink transmission. In such a spectrum, there may be a possibility that one beam may be more congested than other, thus delaying the RACH procedure.

In an embodiment, when the UE 304 has to trigger the RACH procedure in the multi-beam environment on encountering the beam failure/RLF/UL sync/UL grants or on performing the initial access, the UE 304 activates the secondary stack 304b with the same configurations of the physical layer entity, the MAC layer entity, and the RLC layer entity of the primary stack 304a. The UE 304 shares the RACH configuration corresponding to the RACH procedure and the beam ID to the secondary stack.

If the RACH procedure is the CFRA procedure, the UE 304 shares the beam ID (to check the possibility of other best beams) of the primary stack 304a to the secondary stack 304b and initiates the RACH procedure on the secondary stack 304b, if the MSG2 is not received/failed at least once or Reference Signal Received Power (RSRP) is very poor. Since the CFRA procedure is only 2 step procedure with the dedicated preamble, there may be high chance of successful RACH. Thus, if the RACH procedure is the CFRA procedure, the UE 304 chooses the beam on the secondary stack and performs the RACH on the chosen beam simultaneously along with the RACH on the primary stack 304a on the first chosen beam.

In case of the CBRA procedure, since the same RACH trigger may be used in both stacks, there may be a possibility of choosing the same RACH preamble in both stacks, which may result in a contention failure. To avoid the contention failure, the UE 304 shares the preamble information with the primary stack 304a and the secondary stack 304b. In case of CBRA procedure, if the MSG2 is passed, then the RACH procedure on the other stack may be aborted by the UE 304 optionally assuming most RACH failure may occur at the MSG1. The aborted RACH may be re-started again, if there is the RACH failure at the MASG3 on the other stack. If the RACH procedure is successfully completed on the primary stack 304a first, the UE 304 aborts the RACH procedure on the secondary stack 304b. If the RACH procedure is successfully completed on the secondary stack first, the UE 304 aborts the RACH procedure on the primary stack 304a and informs the primary stack 304a about the successful completion of the RACH procedure. The UE 304 then deactivates the secondary stack 304b.

Consider an example scenario, as depicted in FIG. 15, wherein the UE 304 identifies the triggering of the RACH procedure. In an example, the RACH procedure may be triggered due to the BFR, the UL grants, the UL sync, or the like. In another example, the RACH procedure may be triggered due to the temporary RACH issues such as, but not limited to, the MSG1 not reaching network, a RAPID mismatch, a MSG2 decoding failure, the contention failure, vehicular/environmental issues, and so on. In such a scenario, the UE 304 activates the secondary stack 304b using the DAPS capability. The UE 304 performs the same RACH procedure on a beam 1 and a beam 2 using the primary stack 304a and the secondary stack 304b simultaneously. Thus, the UE 304 may connect to at least one of the beam 1 or the beam 2, even if the RACH procedure is failed on one of the beam 2 or the beam 1, respectively. In an example, as depicted in FIG. 15, the RACH procedure performed on the beam 1 using the primary stack 304a may fail, and the RACH procedure performed on the beam 2 using the secondary stack 304b may be successful. Thus, the UE 304 may connect to the beam 2 for accessing the critical services without any delay, which enhances the user experience.

Figure 16A:
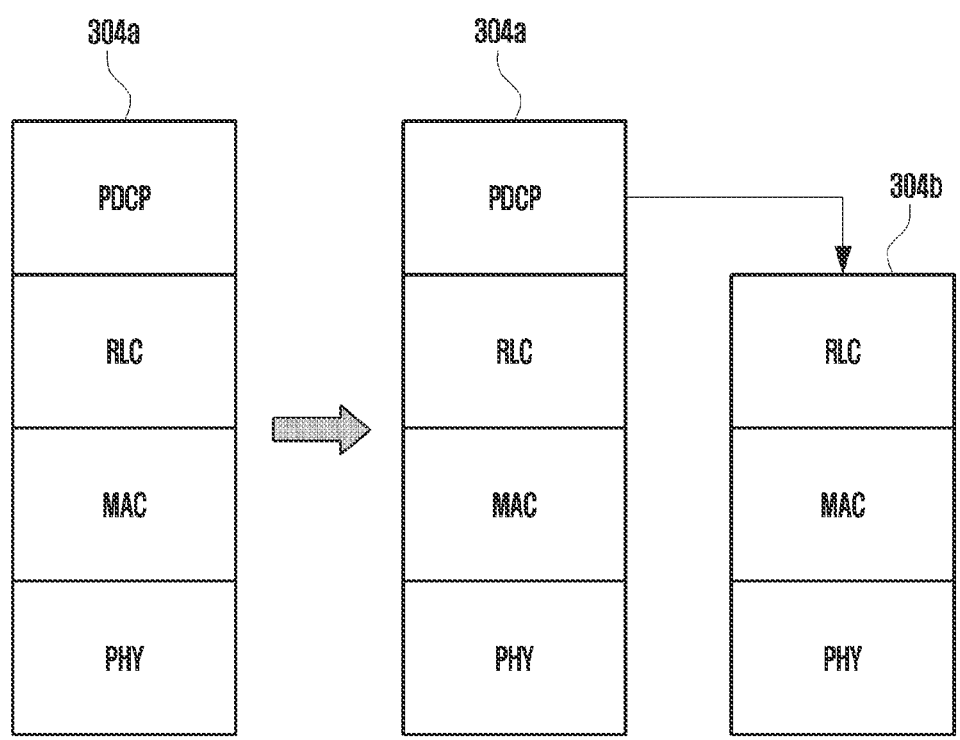
FIG. 16A is a diagram depicting example configuring of the secondary stack for performing the RACH procedure in the multi-beam scenarios, according to various embodiments.
Figure 16B:
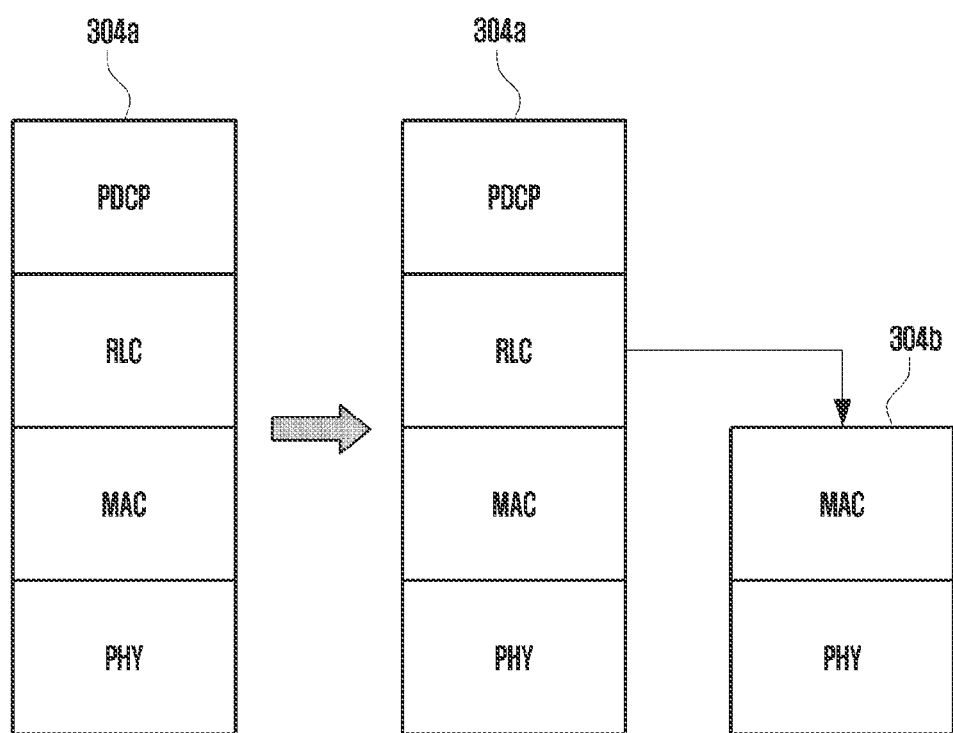
FIG. 16B is a diagram depicting example configuring of the secondary stack for performing the RACH procedure in the multi-beam scenarios, according to various embodiments.

FIG. 16A and FIG. 16B are example diagrams depicting configuring the secondary stack 304b for performing the RACH procedure in the multi-beam scenarios, according to various embodiments.

When the event occurs to trigger the RACH procedure to resume/connect the service on the cell/BS 302 consisting of the multiple beams (for example, FR2 frequency cells), or an event occurs to select the cell 302 among the two different cells 302 when the UE 304 has the valid RACH configuration of both the cells, the UE 304 activates the secondary stack 304b. In an example, the event occurring to trigger the RACH procedure to resume/connect the service may include at least one of the BFR, the initial access, the RLF, the UL sync, the UL grants, or the like. In an example, the event occurring to select the cell among the two different cells may include the initial access.

The UE 304 activates the secondary stack 304b using the DAPS without network intervention. The UE 304 performs the second RACH procedure (with the same trigger reason) on the secondary stack 304b simultaneously with the first RACH procedure on the primary stack 304a.

The activated secondary stack 304b may include the physical layer entity, the MAC layer entity, and the RLC layer entity (an optional layer). The configurations of the physical layer entity of the secondary stack 304b may be same as the primary stack 304a. The UE 304 may receive the configurations of the physical layer entity as a part of 'ServingCellConfigCommonSIB' IE present in the 'SIB1' received from the cell/BS 302 on the primary stack 304a. The UE 304 shares the configurations of the physical layer entity to the secondary stack 304b from the primary stack 304a to configure the physical layer entity at the secondary stack 304b. Similarly, the configurations of the MAC layer entity and the RLC layer entity may be the same as the physical layer entity. The UE 304 may receive the configurations of the RLC layer entity and the MAC layer entity from the cell/BS 302 in the primary stack 304a in the "RRCReconfguration message". The UE 304 may also receive the configurations of the MAC layer entity and the RLC layer entity in 'MAC-LogicalChannelConfig', logicalChannelIdentity ID and servedRadioBearer. The UE 304 may share the configurations of the MAC layer entity and the RLC layer entity to the secondary stack 304b for configuring the MAC layer entity and the RLC layer entity at the secondary stack 304b. The UE 304 may share the configurations of the RLC layer entity to the secondary stack 304b, if the configurations of the RLC layer entity are required for handling the RACH procedure.

The UE 304 may deactivate/disable the secondary stack 304b once one of the RACH procedures is completed, since the secondary stack 304 is used only for the RACH procedure. Thus, the lightweight secondary stack 304b may be provided (FIG. 16B), wherein the split may happen at the RLC layer entity. Thus, the secondary stack 304b may include only the physical layer entity and the RLC layer entity. Splitting at the RLC layer entity may help the UE 304 to save the resources used of the extra RLC protocol.

Once the secondary stack 304b is created, the UE 304 also passes the corresponding RACH trigger configuration/RACH configuration to the secondary stack 304b, which may be the trigger reason for the second RACH procedure. The trigger reason may include at least one of the RLF, the UL sync, the UL data, the BFR, or so on. The UE 304 may receive the RACH configuration as the part of the SIB1 or the "RRCReconfiguration message" based on the trigger reason and the network configuration. Depending on the trigger reason, the UE 304 may pass only the corresponding RACH configuration to the secondary stack 304b.

The UE 304 also shares the preamble information between the primary stack 304a and the secondary stack 304b. For handling the same RACH procedure on both stacks, the RACH resources have to be chosen from the same set of contention-based preambles. The UE 304 ensures that both stacks 304a, 304b may not choose the same preamble.

FIGS. 17A, 17B, 17C, and 17D are diagrams depicting example sharing of the preamble information between the primary stack 304a and the secondary stack 304b, according to various embodiments.

When the same RACH configuration is used in both the primary stack 304a and the secondary stack 304b, there may be a possibility of a same preamble used on both the primary stack 304a and the secondary stack 304b. Also, there may be a possibility that the beams change dynamically during the RACH procedure. Thus, in order to avoid the same preamble on both the primary stack 304a and the secondary stack 304b, the UE 304 may divide the preamble information among both the primary stack 304a and the secondary stack 304b, while the RACH configuration is shared from the primary stack 304a to the secondary stack 304b.

In various embodiments, the UE 304 may share the preamble information between the primary stack 304a and the secondary stack 304b using three methods.

Figure 17A:
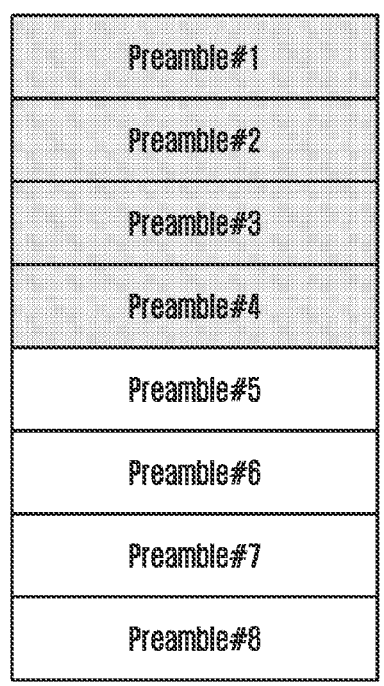
FIG. 17A is a diagram depicting example sharing of the preamble information between a primary stack and the secondary stack, according to various embodiments.

In a first method/method #1, as depicted in FIG. 17A, the UE 304 divides the preamble information/content-based preambles into the two sets, the first set and the second set. The UE 304 assigns the first set to the primary stack 304a and the second set to the secondary stack 304b. In an example, consider that there may be maximum up to 64 (e.g., x=8) preambles allocated for the beam. In such a scenario, the UE 304 divides the preambles into two halves so that the primary stack 304a may choose from the first 32 (x/2) (e.g., the first 4 in FIG. 17A) set of preambles and the secondary stack 304b may choose from the second 32 (x/20) (e.g., the second 4 in FIG. 17A) set of preambles. When the UE 304 uses the first method to share the preamble information between the primary stack 304a and the secondary stack 304b, the preamble sharing may not happen frequently. However, if the number of preambles allocated (the value of x) is less than the both the primary stack 304a and the secondary stack 304b, the UE 304 has to choose from further less number of preambles using a third method/method #3.

Figure 17B:
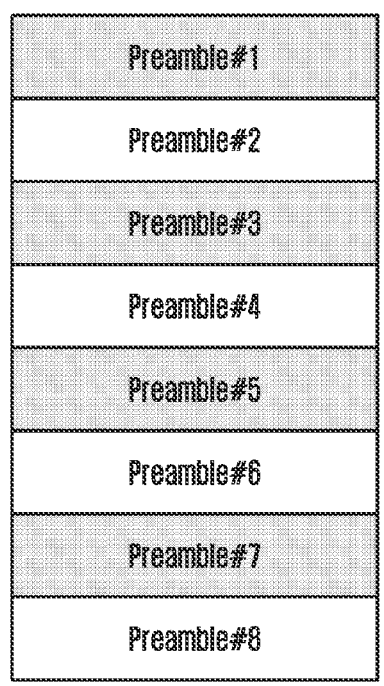
FIG. 17B is a diagram depicting example sharing of the preamble information between a primary stack and the secondary stack, according to various embodiments.

In the second method depicted in FIG. 17B, the UE 304 divides the preambles such that an even set of preambles may be used by the primary stack 304a and an odd set of preambles may be used by the secondary stack 304b. In an example, consider that a maximum of 64 preambles may be allocated for the contention. In such a scenario, the primary stack 304a indicates the secondary stack 304b to choose only from the odd preambles. Thus, the primary stack 304a chooses from the even preambles. When the UE 304 uses the second method to share the preamble information between the primary stack 304a and the secondary stack 304b, the preamble sharing may not happen frequently. However, if the number of preambles allocated (the value of x) is less than the both the primary stack 304a and the secondary stack 304b, the UE 304 has to choose from further less number of preambles using the third method/method #3.

Figure 17C:
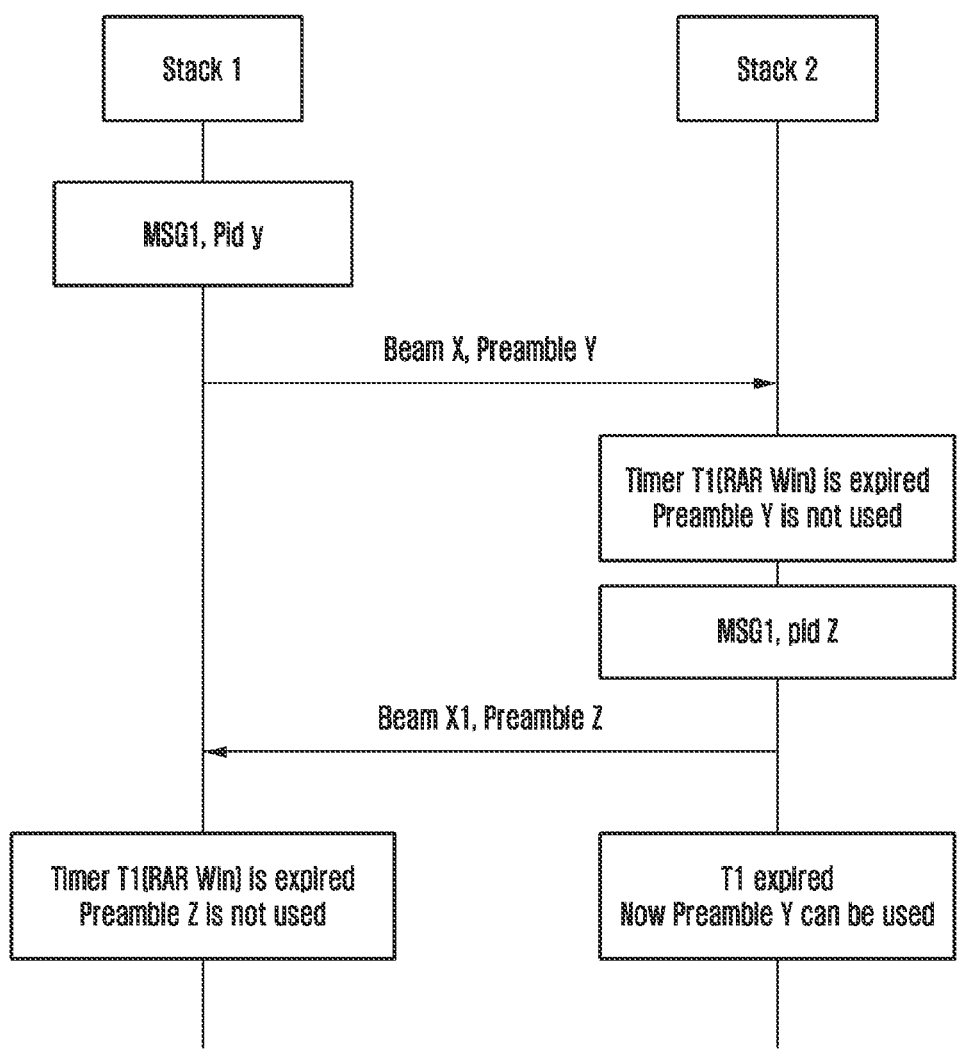
FIG. 17C is a diagram depicting example sharing of the preamble information between a primary stack and the secondary stack, according to various embodiments.

In the third method depicted in FIG. 17C, the UE 304 shares the currently used preamble ID and the beam ID to the secondary stack 304b from the primary stack 304a, so that the secondary stack 304b may not use the particular preamble till the subsequent notification. The third method of sharing the preamble information between the primary stack 304a and the secondary stack 304b may be a dynamic approach of sharing the preambles whenever the stack sends the preamble, the stack sends the corresponding preamble ID and the beam ID to the other stack. The other stack may consider the received preamble ID and the beam ID as valid only till the RAR window is expired. The third method of sharing the preamble information between the primary stack 304a and the secondary stack 304b may be advantageous when the number of preambles allocated is small, as the UE 304 may have almost all preambles to choose from. Since at any point of time only one preamble is not valid for other stack, but there may be more communication between the stacks (i.e., whenever the preamble is sent to the network/BS 302).

Figure 17D:
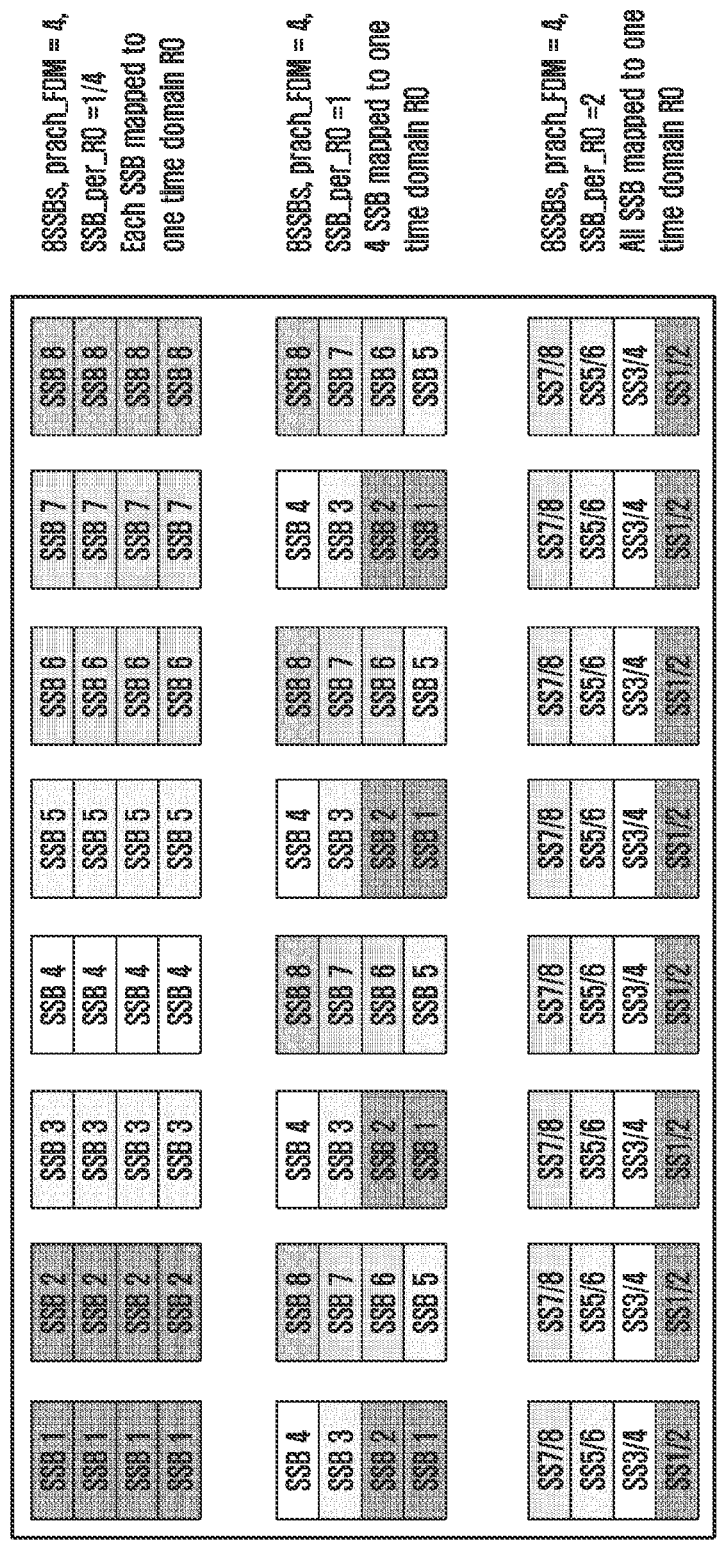
FIG. 17D is a diagram depicting example sharing of the preamble information between a primary stack and the secondary stack, according to various embodiments.

An example method of configuring the preambles and sharing of the preambles among the SSB's depending on the RACH configuration is depicted in FIG. 17D.

Figure 18:
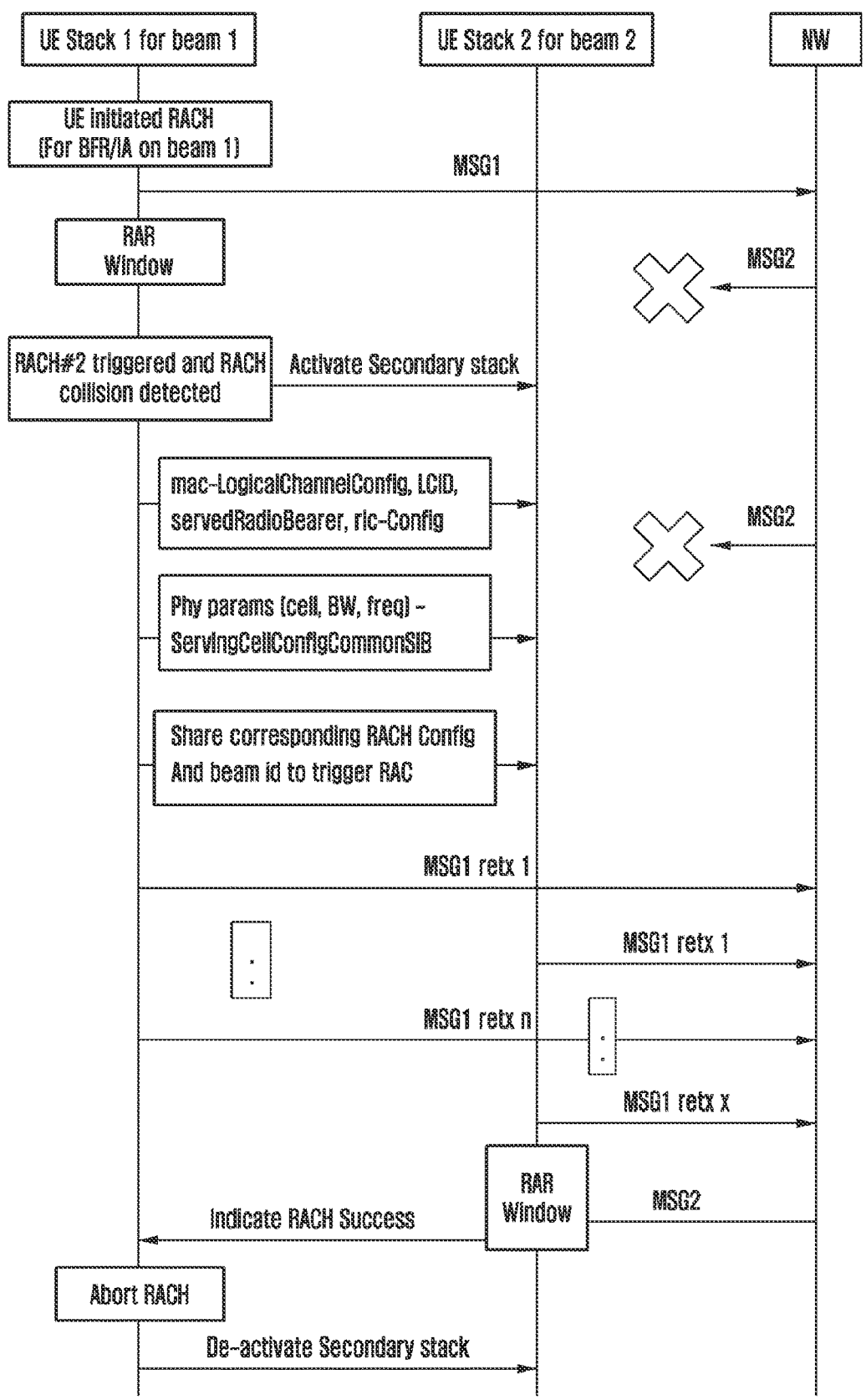
FIG. 18 depicts an example call flow for handling the multiple same RACH procedures in the multi-beam scenario, wherein the RACH procedure is the CFRA procedure, according to various embodiments.

FIG. 18 depicts an example call flow for handling the multiple same RACH procedures in the multi-beam scenario, wherein the RACH procedure is the CFRA procedure, according to various embodiments.

Consider an example scenario, wherein the UE 304 initiates the RACH procedure on the beam 1 using the primary stack 304a due to the BFR. When the UE 304 does not receive the MSG2 during the RAR window, the UE 304 activates the secondary stack 304b using the DAPS. The UE 304 initiates the RACH procedure on the beam 2 using the secondary stack 304b. When the RACH procedure performed on the primary stack 304a or the secondary stack 304b is successful, the UE 304 aborts the ongoing RACH procedure and deactivates the secondary stack 304b. Thus, the BFR may be recovered with more probability of success, as recovery is tried on 2 beams in parallel. When the BFR recovery is performed on the 2 beams simultaneously, the UE 304 may have more probability to pass the BFR quickly on one of the beams, even if there is some temporary issue on the other beam.

Figure 19A:
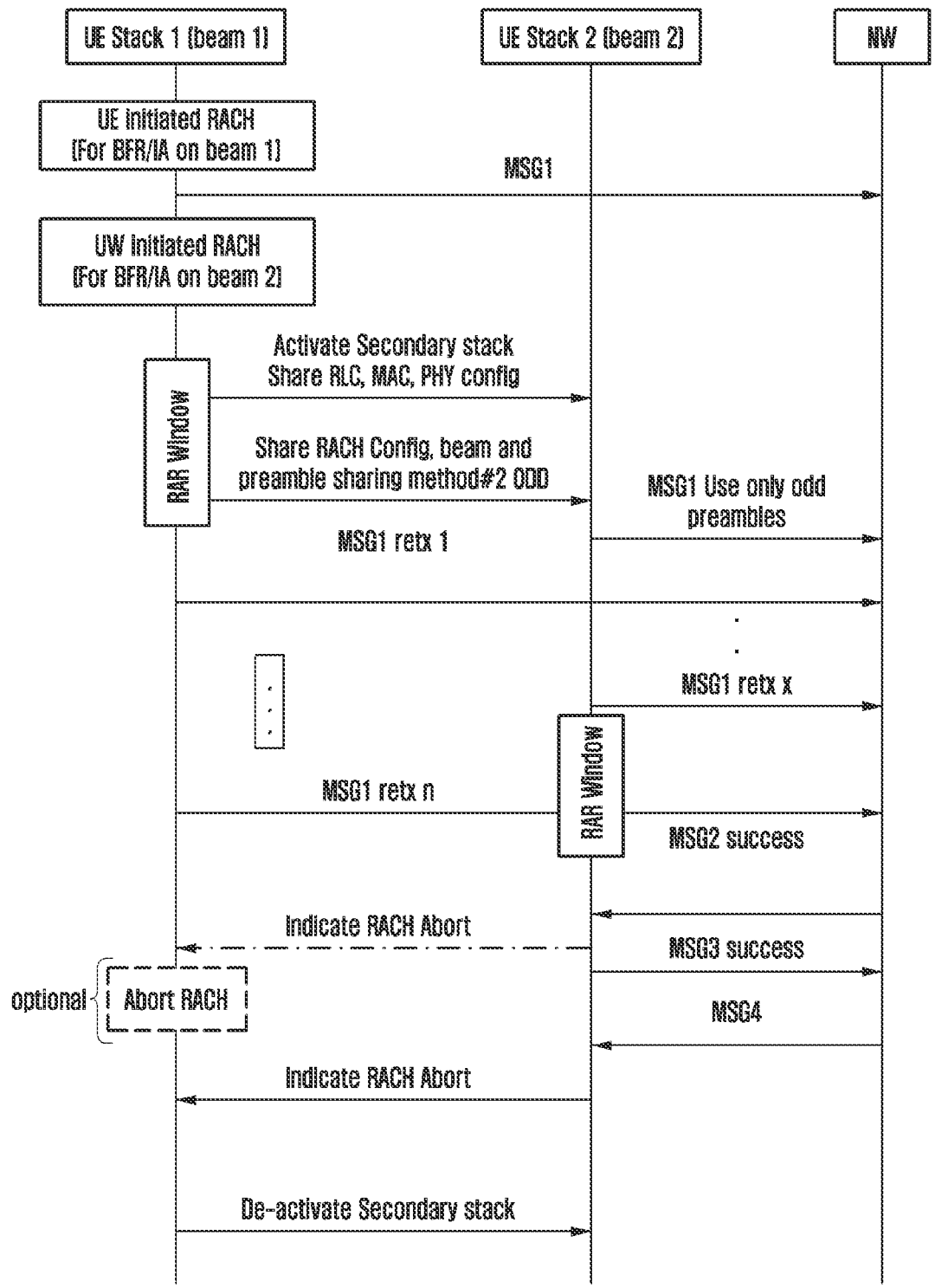
FIG. 19A depicts an example call flow for handling the multiple same RACH procedures in the multi-beam scenario, wherein the RACH procedure is the CBRA procedure, according to various embodiments.
Figure 19B:
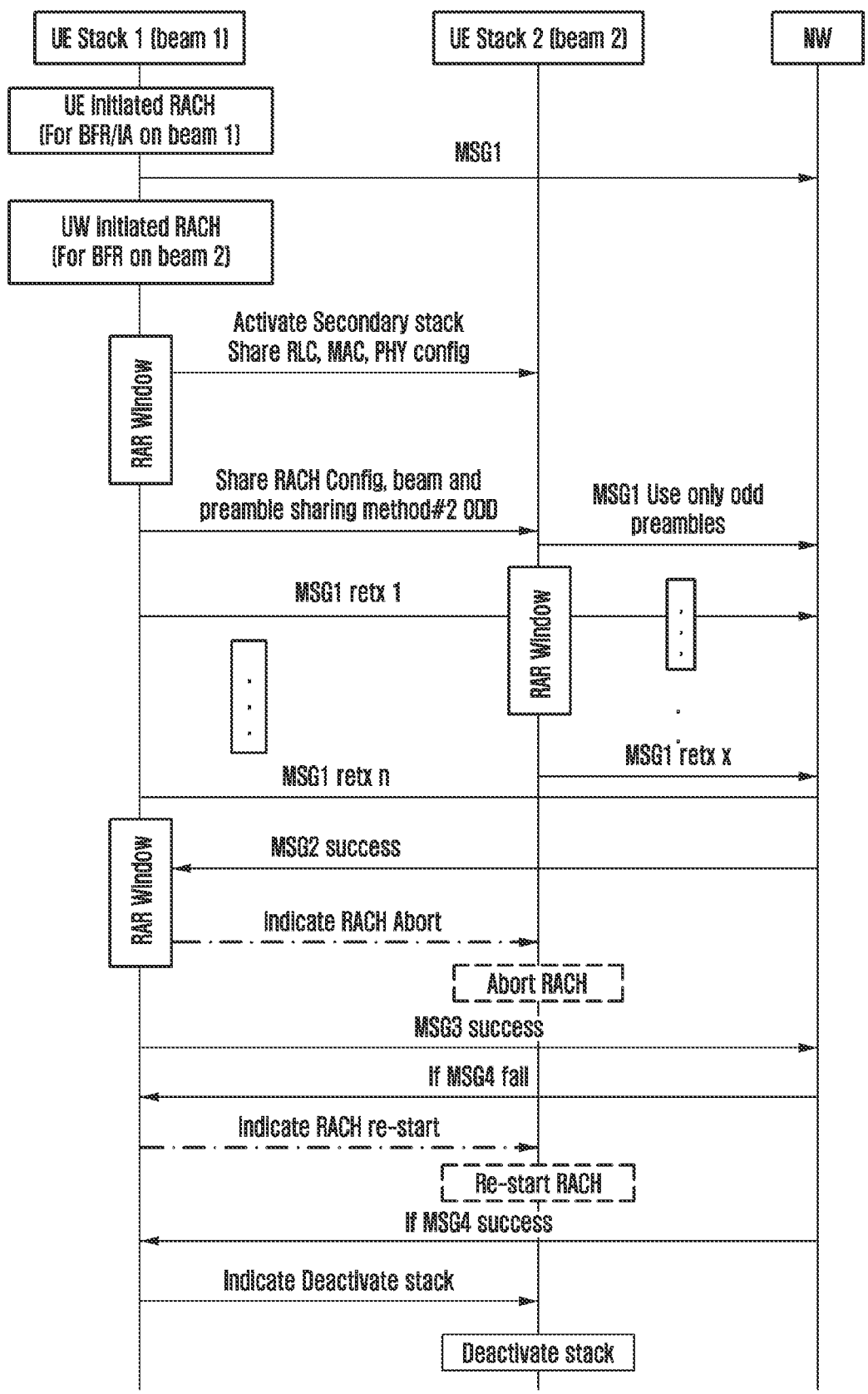
FIG. 19B depicts an example call flow for handling the multiple same RACH procedures in the multi-beam scenario, wherein the RACH procedure is the CBRA procedure, according to various embodiments.

FIGS. 19A and 19B depict example call flows for handling the multiple same RACH procedures in the multi-beam scenario, wherein the RACH procedure is the CBRA procedure, according to various embodiments.

The UE 304 activates the secondary stack 304b using the DAPS capability to handle the RACH procedure on the multiple beams. The UE 304 activates the secondary stack 304b by sharing the configurations of the physical layer entity, the MAC layer entity, and the RLC layer entity, the RACH trigger configuration, and the preamble information. In an example herein, the preamble information may be shared between the primary stack 304a and the secondary stack 304b using the method 2. The primary stack 304a may use the even set of preambles and the secondary stack 304b uses the odd set of preambles.

On activating the secondary stack 304b, the UE 304 initiates the RACH procedure on the beam 1 and the beam 2 due to the BFR using the primary stack 304a and the secondary stack 304b simultaneously. In an example herein, as depicted in FIG. 19A, consider that the RACH procedure on the beam 2 using the secondary stack 304b is successfully completed before the RACH procedure on the beam 1. In such a scenario, the UE 304 aborts the ongoing RACH procedure on the beam 1 using the primary stack 304a and deactivates the secondary stack 304b.

In another example herein, as depicted in FIG. 19B, consider that the RACH procedure on the beam 1 using the primary stack 304a is successfully completed before the RACH procedure on the beam 2. In such a scenario, the UE 304 aborts the ongoing RACH procedure on the beam 2 using the secondary stack 304b and deactivates the secondary stack 304b.

Figure 20:
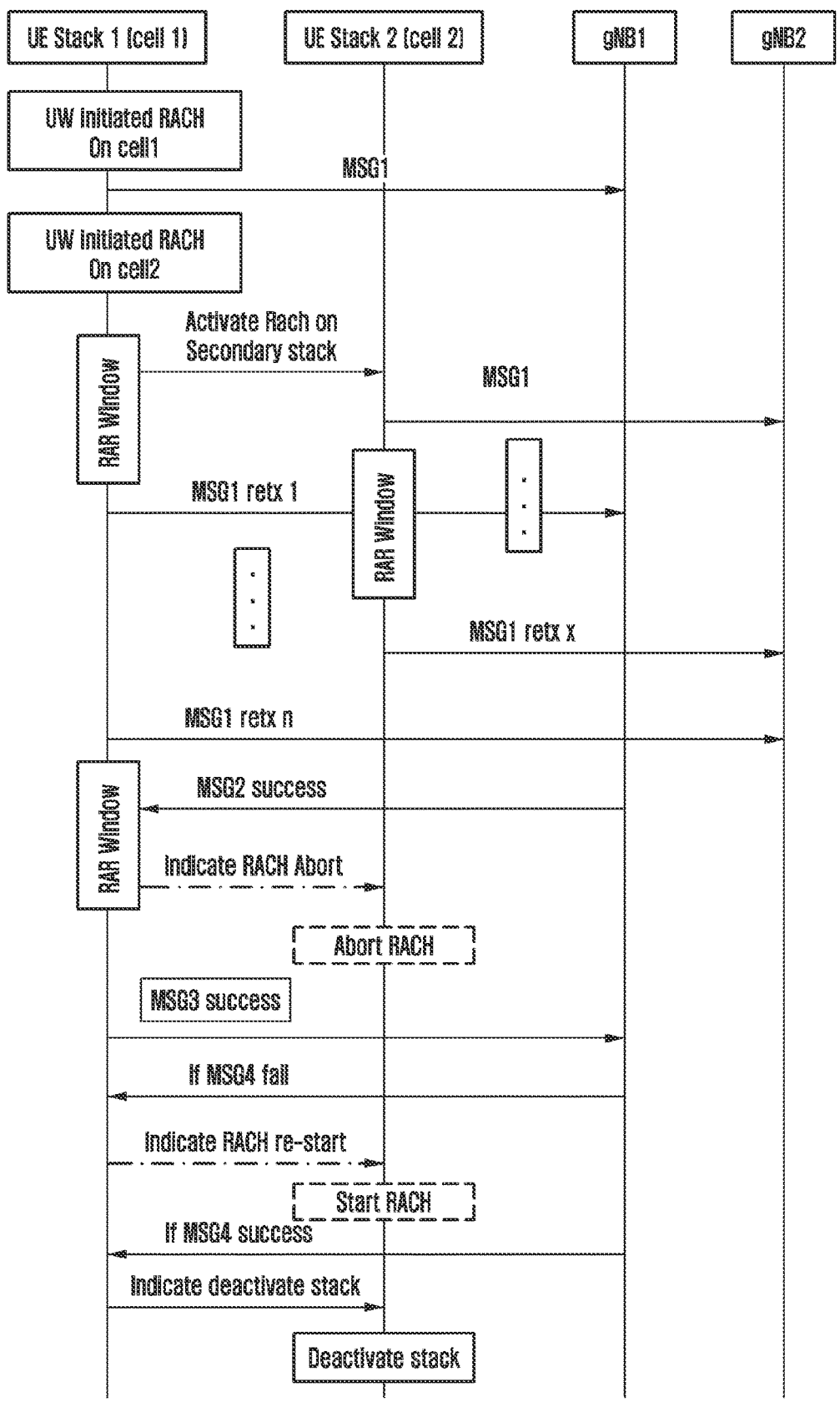
FIG. 20 is a sequence diagram depicting example performing of the RACH procedure on different cells/Base Stations (BSs), according to various embodiments.

FIG. 20 is a sequence diagram depicting example performing of the RACH procedure on the different cells/BSs 302, according to various embodiments.

When the UE 304 with the valid RACH configuration wants to perform an initial access/RACH procedure on the two different cells/BSs 302 (a gNB1, and a gNB2), the UE 304 activates the secondary stack 304b using the DAPS capability. The UE 304 starts the RACH procedure for the initial access on the primary cell/gNB1 using the primary cell RACH configuration and the secondary cell/gNB 2 using the secondary cell RACH configuration simultaneously.

In case of the contention-based RACH, if the MSG2 is passed then the RACH on the other stack may be aborted optionally assuming the most RACH failure happen at the MSG1. In an example, consider that the initial access is successfully completed on the primary stack first. In such a scenario, the UE 304 aborts the RACH procedure on the secondary stack 304b and continues the services from the cell/gNB 1 selected on the primary stack 304a. The UE 304 then deactivates the secondary stack 304b.

In another example, consider that the initial access is successfully completed on the secondary stack first. In such a scenario, the UE 304 aborts the RACH procedure on the primary stack 304a and informs the primary stack 304a about the successful completion of the RACH procedure. The UE 304 continues the services from the cell/gNB 2 selected on the secondary stack 304b. The UE 304 then deactivates the secondary stack 304b.

Figure 21:
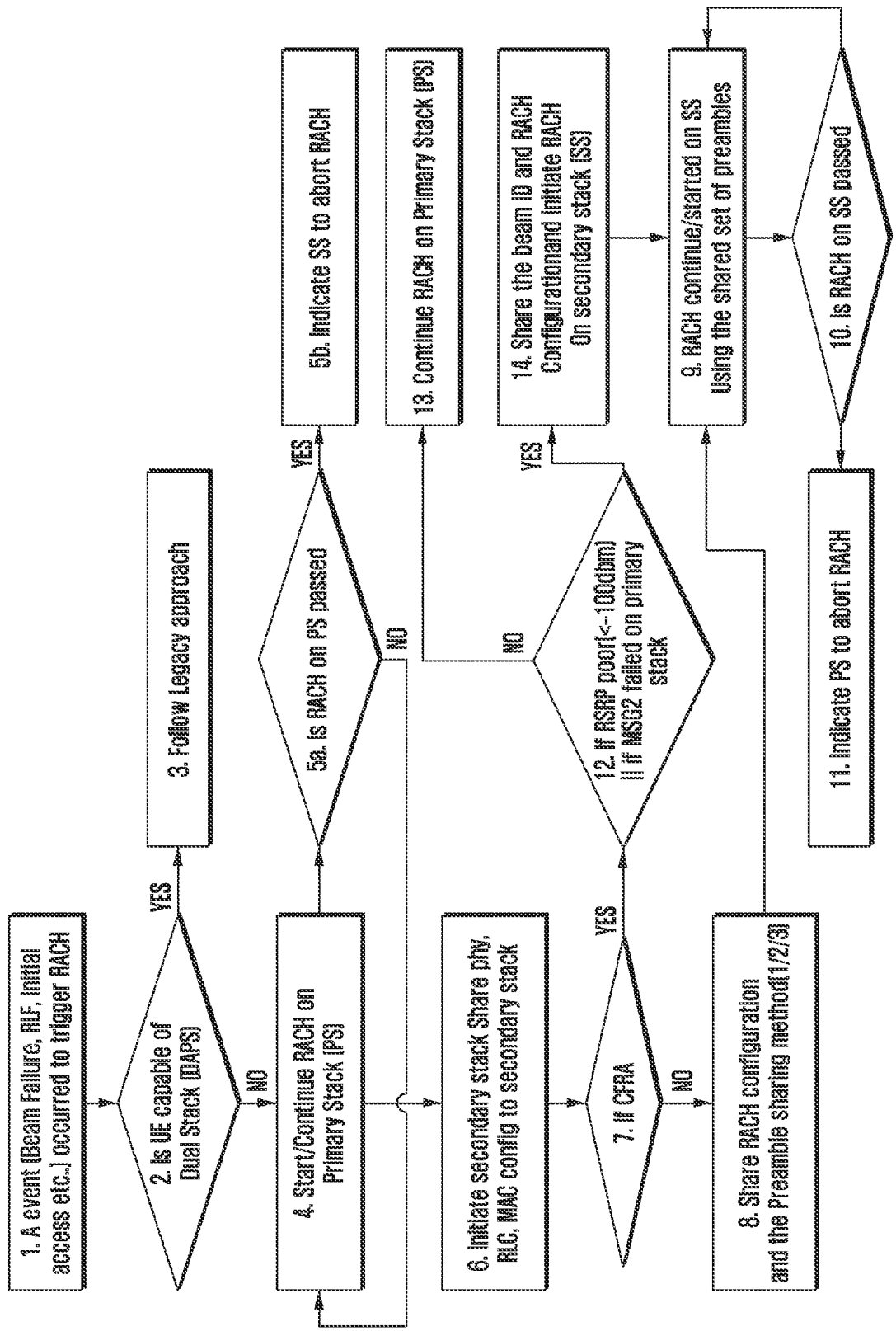
FIG. 21 is a flow chart depicting an example method for handling the RACH procedure in the multi-beam scenario, according to various embodiments.

FIG. 21 is a flow chart depicting an example method for handling the RACH procedure in the multi-beam scenario, according to various embodiments.

At step 1, the UE 304 detects the event (for example, the beam failure, the RLF, the initial access, or the like) occurring to trigger the RACH procedure. At step 2, the UE 304 checks if the UE 304 is capable of supporting the dual stack/DAPS. If the UE 304 does not support the dual stack/DAPS, at step 3, the UE 304 follows the legacy approach to perform the RACH procedure.

If the UE 304 supports the dual stack/DAPS, at step 4, the UE 304 starts the RACH procedure on the beam 1/cell 1 using the primary stack 304a. At step 5a, the UE 304 checks if the RACH procedure passed on the primary stack 304a. If the RACH procedure is passed on the primary stack 304a, at step 5b, the UE 304 aborts the secondary stack 304b. If the RACH procedure is not passed on the primary stack 304a, the UE 304 repeats the step 4 to continue with the step 6.

At step 6, the UE 304 activates the secondary stack 304b by sharing the configurations of the physical layer entity, the MAC layer entity, and the RLC layer entity to the secondary stack 304b from the primary stack 304a. At step 7, the UE 304 checks if the triggered RACH procedure is the CFRA procedure. If the RACH procedure triggered is not the CFRA procedure, at step 8, the UE 304 shares the RACH configuration and the preamble sharing information to the secondary stack 304b. At step 9, the UE 304 starts the RACH procedure on the secondary stack 304b in parallel with the RACH procedure ongoing on the primary stack 304a. At step 10, the UE 304 checks if the RACH procedure is passed on the secondary stack 304b. If the RACH procedure is passed on the secondary stack 304b, at step 11, the UE 304 indicates the primary stack 304a about the successful RACH procedure on the secondary stack 304b.

If the triggered RACH procedure is the CFRA, at step 12, the UE 304 checks if the RSRP is poor (for example, if the RSRP is less than −100 dbm) and if the MSG2 is failed on the primary stack. If the RSRP is not poor and the MSG2 is not failed, at step 13, the UE 304 continues the RACH procedure on the primary stack 304a. If the RSRP is poor and the MSG2 is failed, at step 14, the UE 304 shares the beam ID and the RACH configuration to the secondary stack 304b and initiates the RACH procedure on the secondary stack 304b. On performing step 14, the UE 304 continues with step 9. The various actions listed in FIG. 21 may be performed in the order presented, in a different order or simultaneously. Further, in various embodiments, some actions listed in FIG. 21 may be omitted.

Figure 22:
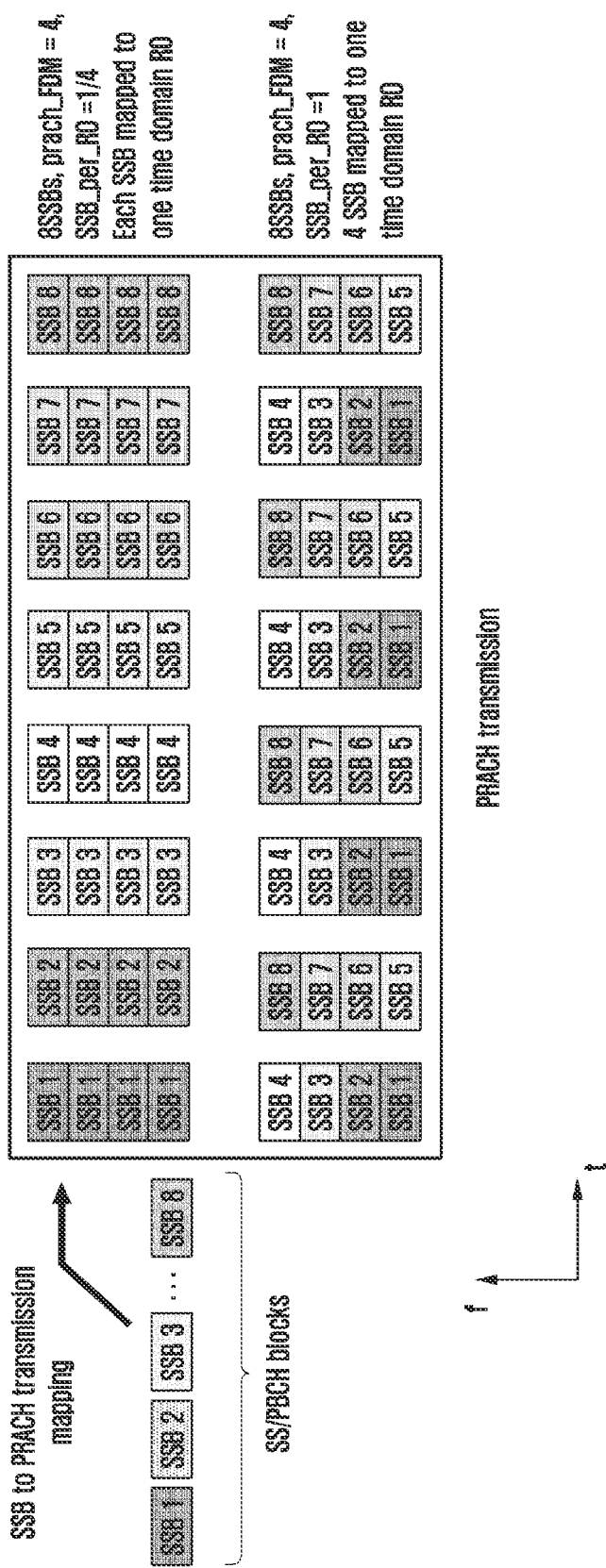
FIG. 22 is a diagram depicting distinguishing between the two same RACH procedures at a cell/BS/network, according to various embodiments.

FIG. 22 is a diagram depicting example distinguishing between the two same RACH procedures at the cell/BS/network 302, according to various embodiments.

Each preamble shared between the primary stack 304a and the secondary stack 304b may have an own set of time, frequency resources, or the like. Also, each RACH procedure may have its own preamble to choose from. Thus, the combination of the preamble and its RACH resources (time and frequency) may be used to distinguish the RACH procedures at the network 302.

Unlike the UE 304, a MAC entity of the network 302 may serve all the UEs 304 that are camped on the particular cell using its single MAC entity. Thus, network 302 may differentiate between the RACH procedures of the UE 304 based on the resources selected by the UE 304.

Embodiments herein enable the UE 304 to perform the RACH procedures with the following advantages:
1. for latency critical applications, performing the RACH procedures on the two different beams may help to recover from the beam failure with reduced latency and resume the services as soon as possible;
2. there may be some temporary issues on one beam (especially due to vehicular blockage or environment issues) which may take more time for the RACH procedure to complete. Hence performing the RACH procedure on the two beams may benefit the UE 304 to complete the RACH procedure earlier on one of the beams;
3. also accessing the two different cells at same time is made possible, even if the RACH procedure is failing on one cell or extra delay on one of the cells, then UE 304 may (re) gain the services if the RACH procedure is successful on one cell;
4. performing the RACH procedure on the 2 different beams using the two stacks in parallel may be helpful if the best beam is highly congested during the CBRA procedure, since there may be a high chance of the RACH procedure being successful earlier in one of the beams; and
5. performing the RACH procedure on the 2 different beams using the two stacks in parallel may be helpful in the un-licensed spectrum as there may be a LBT (listen before talk) failure on the one beam but on the other beam the RACH procedure may be successful due to the nature of devices working on the un-licensed spectrum.

The embodiments disclosed herein can be implemented through at least one software program running on at least one hardware device and performing network management functions to control the elements. The elements shown in FIGS. 3A, 3B, 3C, and 4 can be at least one of a hardware device, or a combination of hardware device and software module.

Figure 23:
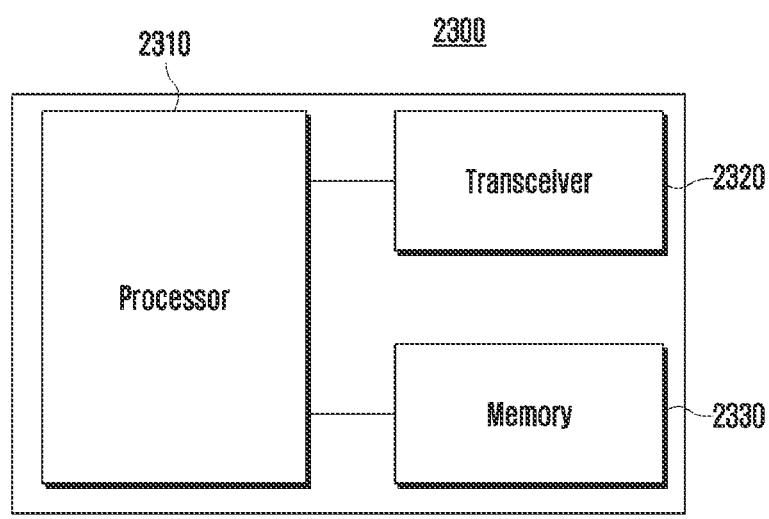
FIG. 23 illustrates an example electronic device according to various embodiments.

FIG. 23 illustrates an example electronic device according to various embodiments.

Referring to the FIG. 23, the electronic device 2300 may include a processor (or a controller) 2310, a transceiver 2320 and a memory 2330. However, all of the illustrated components are not essential. The electronic device 2300 may be implemented by more or fewer components than those illustrated in FIG. 23. In addition, the processor 2310 and the transceiver 2320 and the memory 2330 may be implemented as a single chip according to various embodiments.

The electronic device 2300 may correspond to the electronic device described above. For example, the electronic device 2300 may correspond to the terminal or the UE 304 illustrated in FIGS. 3A, 3B, 3C and 4.

The aforementioned components will now be described in detail.

The processor 2310 (e.g., including processing circuitry) may include one or more processors or other processing devices that control the proposed function, process, and/or method. Operation of the electronic device 2300 may be implemented by the processor 2310.

The transceiver 2320 may include an RF transmitter for up-converting and amplifying a transmitted signal, and an RF receiver for down-converting a frequency of a received signal. However, according to various embodiments, the transceiver 2320 may be implemented by more or fewer components.

The transceiver 2320 may be connected to the processor 2310 and transmit and/or receive a signal. The signal may include control information and data. In addition, the transceiver 2320 may receive the signal through a wireless channel and output the signal to the processor 2310. The transceiver 2320 may transmit a signal output from the processor 2310 through the wireless channel.

The memory 2330 may store the control information or the data included in a signal obtained by the electronic device 2300. The memory 2330 may be connected to the processor 2310 and store at least one instruction or a protocol or a parameter for the proposed function, process, and/or method. The memory 2330 may include read-only memory (ROM) and/or random access memory (RAM) and/or hard disk and/or CD-ROM and/or DVD and/or other storage devices.

Figure 24:
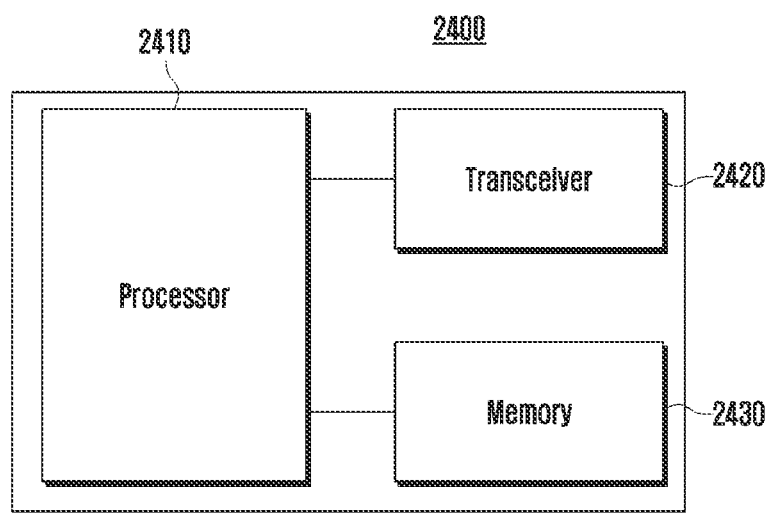
FIG. 24 illustrates an example base station according to various embodiments.

FIG. 24 illustrates an example base station according to various embodiments.

Referring to the FIG. 24, the base station 2400 may include a processor (or a controller) 2410, a transceiver 2420 and a memory 2430. However, all of the illustrated components are not essential. The base station 2400 may be implemented by more or fewer components than those illustrated in FIG. 24. In addition, the processor 2410 and the transceiver 2420 and the memory 2430 may be implemented as a single chip according to another embodiment.

The base station 2400 may correspond to the gNB described above. For example, the base station 2400 may correspond to the gNB 302 illustrated in FIGS. 3B and 3C.

The aforementioned components will now be described in detail.

The processor 2410 (e.g., including processing circuitry) may include one or more processors or other processing devices that control the proposed function, process, and/or method. Operation of the base station 2400 may be implemented by the processor 2410.

The transceiver 2420 may include an RF transmitter for up-converting and amplifying a transmitted signal, and an RF receiver for down-converting a frequency of a received signal. However, according to various embodiments, the transceiver 2420 may be implemented by more or fewer components.

The transceiver 2420 may be connected to the processor 2410 and transmit and/or receive a signal. The signal may include control information and data. In addition, the transceiver 2420 may receive the signal through a wireless channel and output the signal to the processor 2410. The transceiver 2420 may transmit a signal output from the processor 2410 through the wireless channel.

The memory 2430 may store the control information or the data included in a signal obtained by the base station 2400. The memory 2430 may be connected to the processor 2410 and store at least one instruction or a protocol or a parameter for the proposed function, process, and/or method. The memory 2430 may include read-only memory (ROM) and/or random access memory (RAM) and/or hard disk and/or CD-ROM and/or DVD and/or other storage devices.

Although this disclosure has been described with an exemplary embodiment, various changes and modifications may be suggested to one skilled in the art. It is intended that this disclosure encompass such changes and modifications as fall within the scope of the appended claims.

Embodiments disclosed herein describe methods and systems for handling multiple Random Access Channel (RACH) procedures. Therefore, it is understood that the scope of the protection is extended to such a program and in addition to a computer readable medium having at least one instruction therein, such computer readable storage medium containing program code for implementation of one or more operations of the method, when the program runs on a server or mobile device or any suitable programmable device. The method is implemented in embodiments through or together with a software program written in e.g., Very high speed integrated circuit Hardware Description Language (VHDL), another programming language, or implemented by one or more VHDL or several software modules being executed on at least one hardware device. The hardware device may be any kind of portable device that may be programmed. The device may also include means which could be e.g., hardware such as e.g., an ASIC, or a combination of hardware and software, e.g., an ASIC and an FPGA, or at least one microprocessor and at least one memory with software modules located therein. Embodiments described herein could be implemented partly in hardware and partly in software. The concepts may be implemented on different hardware devices, e.g., using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

What is claimed is:

1. A method performed by a user equipment (UE) in a wireless communication system, the method comprising:
   detecting triggering of a first random access channel (RACH) procedure running on a primary stack at the UE upon detection of a RACH trigger condition on the primary stack, while the UE is connected to at least one cell;
   detecting triggering of a second RACH procedure while the first RACH procedure is ongoing in the UE, wherein the second RACH procedure is different from the first RACH procedure;
   enabling a dual active protocol stack (DAPS) capability to initiate a secondary stack for handling the second RACH procedure;
   performing the first RACH procedure on the primary stack and the second RACH procedure on the secondary stack, simultaneously; and
   disabling the secondary stack upon successful completion of the second RACH procedure.

2. The method of claim 1, wherein the first RACH procedure and the second RACH procedure are performed on a medium access control (MAC) entity at the UE, wherein the first stack and the secondary stack are included in the MAC entity.

3. The method of claim 1, wherein the first RACH procedure includes at least one of:
   a non-handover procedure;
   a RACH procedure triggered for an uplink (UL) grant and a UL synchronization; or
   a RACH procedure triggered on the at least one cell from a primary timing advance group (pTAG), wherein the at least one cell is a primary cell.

4. The method of claim 1, wherein the second RACH procedure includes at least one of:
   an on-demand system information (SI) RACH procedure, when the first RACH procedure is a RACH procedure triggered for at least one of an uplink (UL) grant and a UL synchronization;
   a RACH procedure triggered on a secondary cell from a secondary timing advance group (sTAG), when the first RACH procedure is a RACH procedure triggered on a primary cell from a primary timing advance group (pTAG); or
   a RACH procedure triggered due to an SI request received for at least one service or based on cell reselection parameters, wherein the SI request is a request for SI other than a system information block 1 (SIB1) and the at least one service includes at least one of a vehicle to everything (V2X) service, a device to device (D2D) service, or a sidelink service.

5. The method of claim 1, wherein the triggering of the second RACH procedure further comprises at least one of:
   triggering the second RACH procedure, when the UE receives an on-demand system information (SI) request for at least one service during the ongoing first RACH procedure;

triggering the second RACH procedure, when the UE has an uplink (UL) data for a UL synchronization during the ongoing first RACH procedure;

triggering the second RACH procedure, when the UE has the UL data and no grants are available for the UE to send the UL data during the ongoing first RACH procedure; or triggering the second RACH procedure on a secondary cell, when the UE configured with a UL-carrier aggregation (CA) triggers the first RACH procedure on a primary cell, wherein the primary cell and the secondary cell have a single medium access control (MAC) entity.

6. The method of claim 1, wherein the enabling of the DAPS capability to initiate the secondary stack further comprises:

initiating the secondary stack by configuring the secondary stack with configurations of at least one entity of the primary stack; and sharing RACH trigger configurations corresponding to the second RACH procedure from the primary stack to the secondary stack that enables the secondary stack to handle the second RACH procedure.

7. The method of claim 6, wherein the initiating of the secondary stack by configuring the secondary stack further comprises:

providing configurations of a physical layer entity from the primary stack to the secondary stack, wherein the configurations of the physical layer entity are received by the UE on the primary stack through a system information block 1 (SIB1), wherein the SIB1 includes at least one of frequency information, band information, bandwidth information, physical cell identifier (ID) information, or bandwidth part (BWP) information for the primary cell; and providing configurations of a medium access control (MAC) entity from the primary stack to the secondary stack, wherein the configurations of the MAC entity are received by the UE on the primary stack through at least one of a radio resource configuration (RRC) message, a MAC logical channel configuration, a logical channel identity, or a served radio bearer.

8. The method of claim 7, further comprising sharing configurations of a radio link control (RLC) entity from the primary stack to the secondary stack, in case that the configurations of the RLC entity are required for the secondary stack to handle the second RACH procedure.

9. The method of claim 6, wherein the RACH trigger configurations corresponding to the secondary RACH procedure are received by the UE on the primary stack through a system information block 1 (SIB1) or a radio resource control (RRC) reconfiguration message, based on a trigger reason for the second RACH procedure and a network configuration.

10. The method of claim 8, further comprising performing a bearer split at the RLC entity for mapping at least one data radio bearer (DRB) to logical channels on the secondary stack to support the second RACH procedure.

11. A user equipment (UE) in a wireless communication system, the UE comprising:

a transceiver; and a controller coupled with the transceiver and configured to:

detect triggering of a first random access channel (RACH) procedure running on a primary stack at the UE upon detection of a RACH trigger condition on the primary stack, while the UE is connected to at least one cell, detect triggering of a second RACH procedure while the first RACH procedure is ongoing in the UE, wherein the second RACH procedure is different from the first RACH procedure, enable a dual active protocol stack (DAPS) capability to initiate a secondary stack for handling the second RACH procedure, perform the first RACH procedure on the primary stack and the second RACH procedure on the secondary stack, simultaneously, and disable the secondary stack upon successful completion of the second RACH procedure.

12. The UE of claim 11, wherein the first RACH procedure and the second RACH procedure are performed on a medium access control (MAC) entity at the UE, wherein the first stack and the secondary stack are included in the MAC entity.

13. The UE of claim 11, wherein the first RACH procedure includes at least one of:

a non-handover procedure;

a RACH procedure triggered for an uplink (UL) grant and a UL synchronization; or a RACH procedure triggered on the at least one cell from a primary timing advance group (pTAG), wherein the at least one cell is a primary cell.

14. The UE of claim 11, wherein the second RACH procedure includes at least one of:

an on-demand system information (SI) RACH procedure, when the first RACH procedure is a RACH procedure triggered for at least one of an uplink (UL) grant and a UL synchronization;

a RACH procedure triggered on a secondary cell from a secondary timing advance group (sTAG), when the first RACH procedure is a RACH procedure triggered on a primary cell from a primary timing advance group (pTAG); or a RACH procedure triggered due to an SI request received for at least one service or based on cell reselection parameters, wherein the SI request is a request for SI other than a system information block 1 (SIB1) and the at least one service includes at least one of a vehicle to everything (V2X) service, a device to device (D2D) service, or a sidelink service.

15. The UE of claim 11, wherein the controller is further configured to:

trigger the second RACH procedure, when the UE receives an on-demand system information (SI) request for at least one service during the ongoing first RACH procedure, trigger the second RACH procedure, when the UE has an uplink (UL) data for a UL synchronization during the ongoing first RACH procedure, trigger the second RACH procedure, when the UE has the UL data and no grants are available for the UE to send the UL data during the ongoing first RACH procedure, or trigger the second RACH procedure on a secondary cell, when the UE configured with a UL-carrier aggregation (CA) triggers the first RACH procedure on a primary cell, wherein the primary cell and the secondary cell have a single medium access control (MAC) entity.

16. The UE of claim 11, wherein the controller is further configured to:
  initiate the secondary stack by configuring the secondary stack with configurations of at least one entity of the primary stack, and
  share RACH trigger configurations corresponding to the second RACH procedure from the primary stack to the secondary stack that enables the secondary stack to handle the second RACH procedure.

17. The UE of claim 16, wherein the controller is further configured to:
  provide configurations of a physical layer entity from the primary stack to the secondary stack, wherein the configurations of the physical layer entity are received by the UE on the primary stack through a system information block 1 (SIB1), wherein the SIB1 includes at least one of frequency information, band information, bandwidth information, physical cell identifier (ID) information, or bandwidth part (BWP) information for the primary cell, and
  provide configurations of a medium access control (MAC) entity from the primary stack to the secondary stack, wherein the configurations of the MAC entity are received by the UE on the primary stack through at least one of a radio resource configuration (RRC) message, a MAC logical channel configuration, a logical channel identity, or a served radio bearer.

18. The UE of claim 17, wherein the controller is further configured to share configurations of a radio link control (RLC) entity from the primary stack to the secondary stack, in case that the configurations of the RLC entity are required for the secondary stack to handle the second RACH procedure.

19. The UE of claim 16, wherein the RACH trigger configurations corresponding to the secondary RACH procedure are received by the UE on the primary stack through a system information block 1 (SIB1) or a radio resource control (RRC) reconfiguration message, based on a trigger reason for the second RACH procedure and a network configuration.

20. The UE of claim 18, wherein the controller is further configured to perform a bearer split at the RLC entity for mapping at least one data radio bearer (DRB) to logical channels on the secondary stack to support the second RACH procedure.

* * * * *